(12) United States Patent  (10) Patent No.: US 7,433,517 B2
Kato et al.  (45) Date of Patent: Oct. 7, 2008

(54) IMAGE PROCESSING APPARATUS AND METHOD FOR CONVERTING IMAGE DATA TO PREDETERMINED FORMAT

(75) Inventors: Shinichi Kato, Kanagawa (JP); Yushi Matsukubo, Kanagawa (JP); Hiroyuki Yaguchi, Kanagawa (JP); Eiichi Nishikawa, Kanagawa (JP); Hiroyuki Tsuji, Kanagawa (JP); Masakazu Kitora, Kanagawa (JP); Kenzou Sekiguchi, Tokyo (JP); Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 691 days.

(21) Appl. No.: 10/993,450

(22) Filed: Nov. 19, 2004

(65) Prior Publication Data

US 2005/0111745 A1 May 26, 2005

(30) Foreign Application Priority Data

Nov. 20, 2003 (JP) ............................. 2003-390749

(51) Int. Cl.
*G06K 9/34* (2006.01)
(52) U.S. Cl. ...................................... 382/180; 382/176
(58) Field of Classification Search .......... 382/173–180
See application file for complete search history.

(56) References Cited

U.S. PATENT DOCUMENTS 7,013,309 B2 * 3/2006 Chakraborty et al. .... 707/104.1
2001/0015823 A1 8/2001 Sato

FOREIGN PATENT DOCUMENTS

| JP | 06-348830 A | 12/1994 |
| JP | 2000-013596 A | 1/2000 |
| JP | 2000-059605 A | 2/2000 |
| JP | 2003-263301 A | 9/2003 |

* cited by examiner

*Primary Examiner*—Matthew C. Bella
*Assistant Examiner*—Wesley Tucker
(74) *Attorney, Agent, or Firm*—Canon U.S.A. Inc., I.P. Division

(57) ABSTRACT

An image processing apparatus includes: a reading unit adapted to read an image and to generate image data representing the image; a separating unit adapted to separate the image data obtained by the reading unit into a plurality of objects corresponding to attributes; a selecting unit adapted to select a predetermined attribute of the image; a vectorization unit adapted to perform a vector conversion process for the image data separated by the separating unit in accordance with the predetermined attribute selected by the selecting unit; and an output unit adapted to output the image data processed by the vectorization unit.

8 Claims, 27 Drawing Sheets

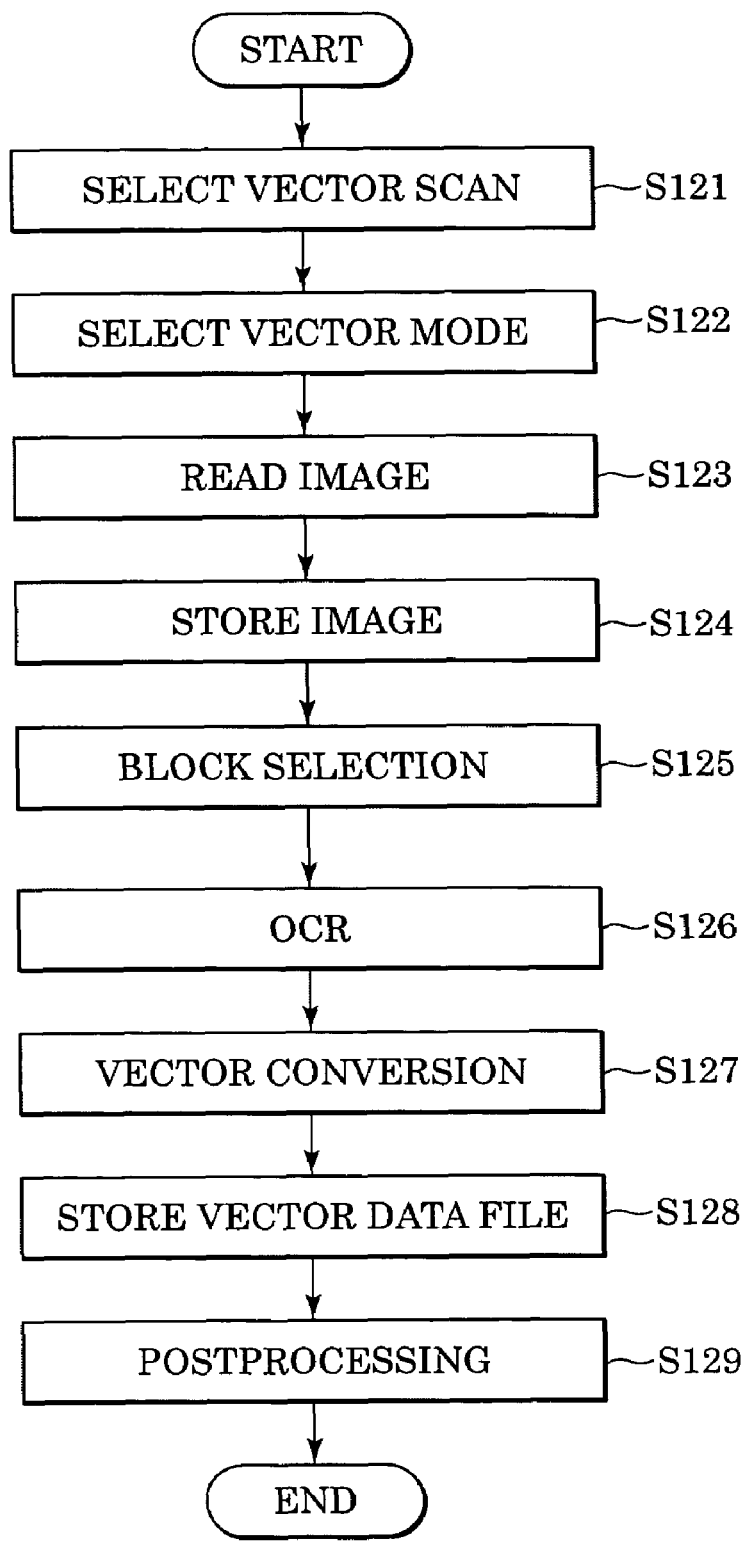

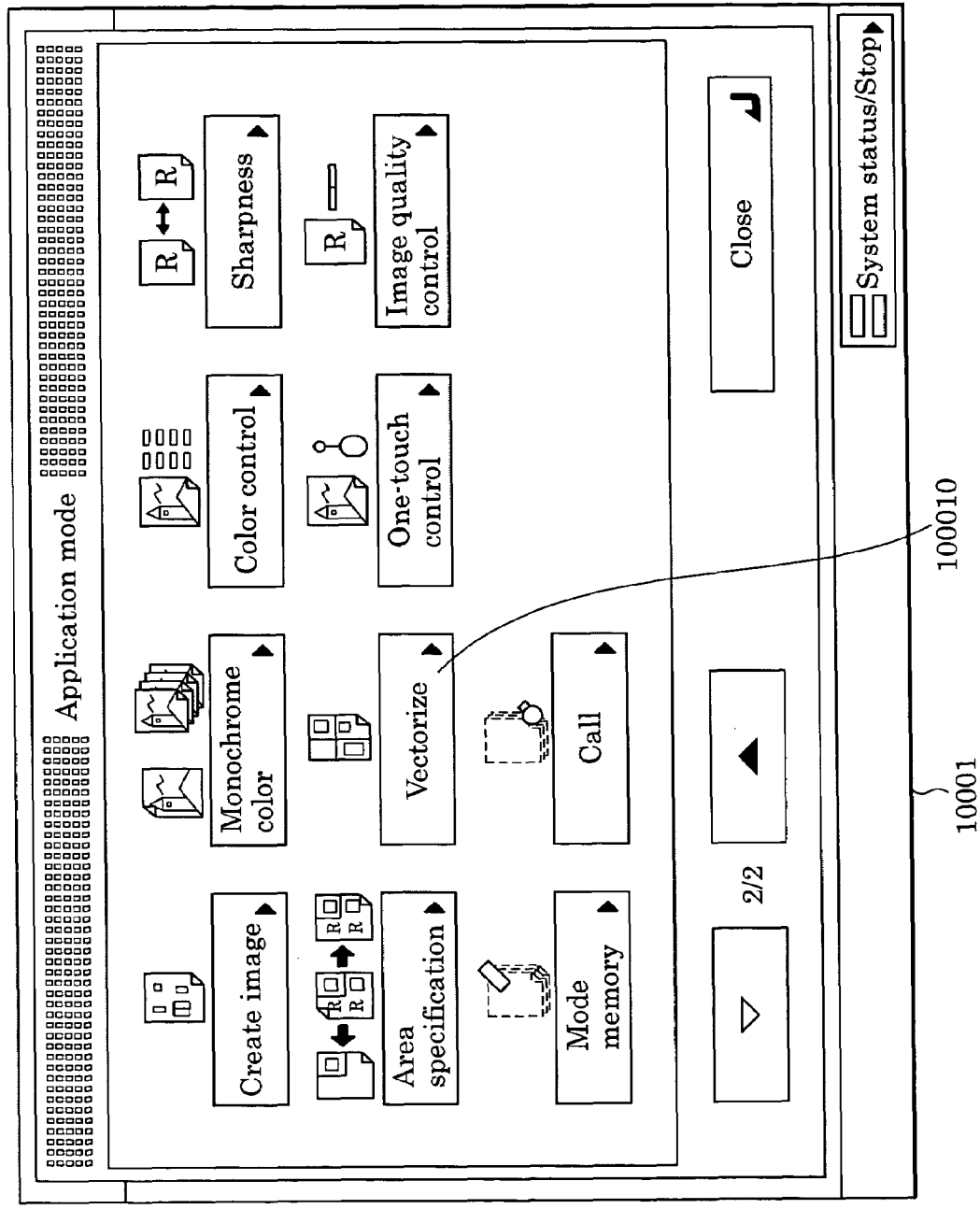

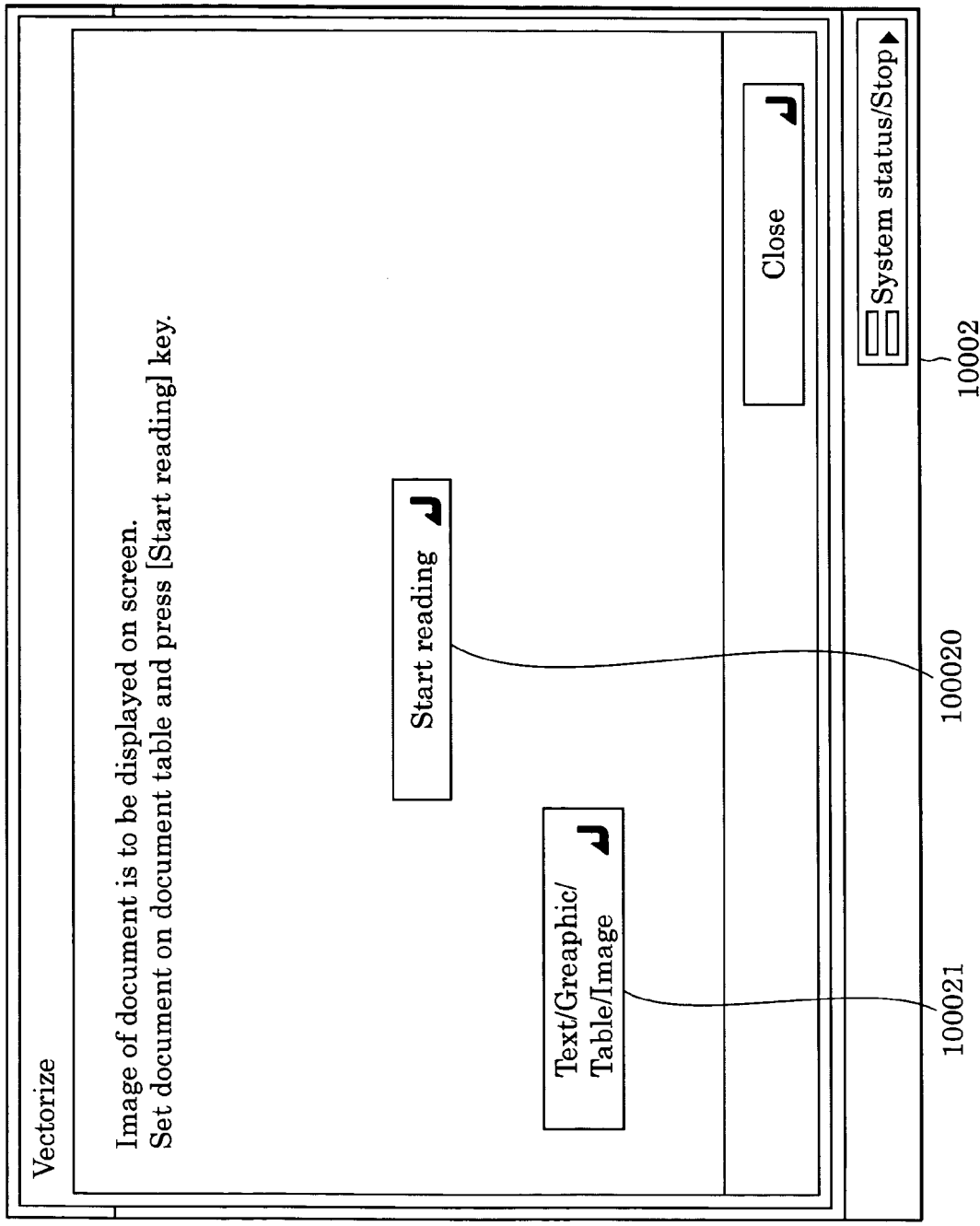

FIG. 6

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | |
| BLOCK 2 | 3 | X2 | Y2 | W2 | H2 | |
| BLOCK 3 | 2 | X3 | Y3 | W3 | H3 | |
| BLOCK 4 | 1 | X4 | Y4 | W4 | H4 | |
| BLOCK 5 | 3 | X5 | Y5 | W5 | H5 | |
| BLOCK 6 | 4 | X6 | Y6 | W6 | H6 | |

INPUT FILE INFORMATION

| TOTAL NUMBER OF BLOCKS | N(=6) |
|---|---|

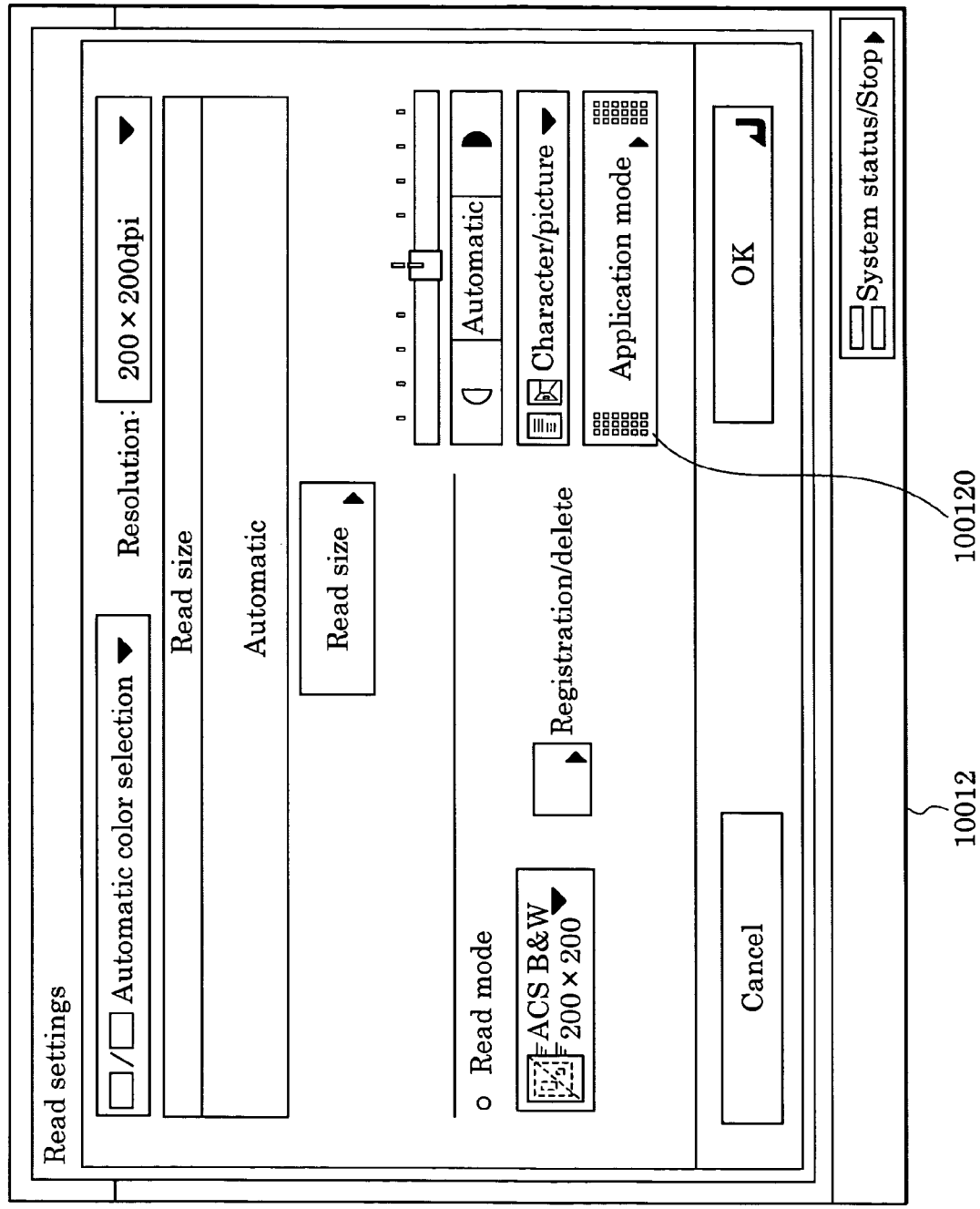

FIG. 20B

| | Type | Name of document | Size of sheet | Page | Date/time |
|---|---|---|---|---|---|
| | | 20030513181424 | A4 | | 1 05/13 18:14 |

User box  / 00  Total 1

◁ 1/1 ▷

Select all

Delete

Display image ▽  Print ▽  Detailed information ▽

Move/ Copy ▽  Read document ▲  Send ▽

Close

System status/Stop ▲

FIG. 20C

User box / 00 Total 1

| | Type | Name of document | Size of sheet | Page | Date/time |
|---|---|---|---|---|---|
| 1 | | 20030513181424 | A4 | 1 | 05/13 18:14 |

◁ 1/1 ▷

Cancel select

Detailed information ▲

Display image ▲    Print ▲    Delete

Move/ Copy ▲    Read document ▲    Send ▲

Close

System status/Stop ▲

100220

100221

100222

10022

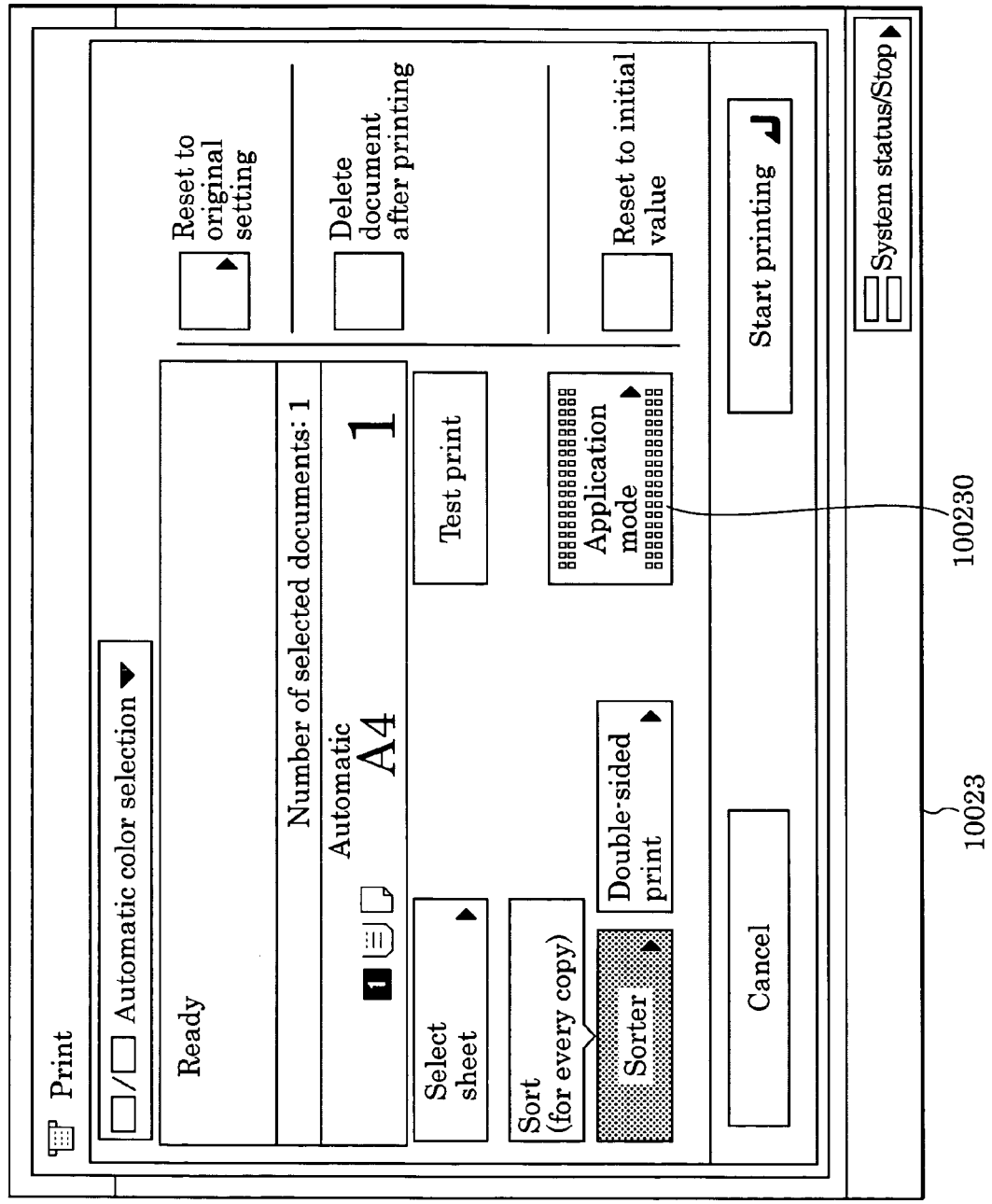

IMAGE PROCESSING APPARATUS AND METHOD FOR CONVERTING IMAGE DATA TO PREDETERMINED FORMAT

This application claims priority from Japanese Patent Application No. 2003-390749 filed Nov. 20, 2003, which is hereby incorporated by reference herein.

BACKGROUND OF THE INVENTION

1. Field of the Invention

The present invention relates to an image processing apparatus and an image processing method. Particularly, the present invention relates to an image converting apparatus and an image converting method capable of outputting input image data after vector conversion is performed for the image data.

2. Description of the Related Art

Paperless offices have increasingly and rapidly become widespread as environmental issues draw attention. In order to realize such paperless offices, document management systems for storing images in a portable document format (hereinafter referred to as a PDF) in an image storing apparatus and managing the stored images or image communication systems for transmitting the images to remote sites have been suggested (for example, Japanese Patent Laid-Open No. 2001-358857). In these systems, paper documents that have been stored in binders or the like are read by a scanner and the read images are converted into the PDF.

Although paper documents can be stored as PDF files each having a small amount of information in the above document management systems, it is difficult to reuse objects (for example, graphics and tables), having various attributes, in the PDF files corresponding to the paper documents because the files themselves are image information. Accordingly, in order to reuse desired objects in the PDF files corresponding to the paper documents, the content corresponding to the desired objects is regenerated by using application software for editing graphics or tables.

SUMMARY OF THE INVENTION

The present invention provides an image processing apparatus and an image processing method capable of resolving the above problems.

The present invention provides an image processing apparatus and an image processing method capable of generating a data file having an appropriate data structure in accordance with the application or purpose. The present invention provides an image processing apparatus and an image processing method capable of converting a specified object, among a plurality of objects included in input image data, into a desired format. The present invention provides an image processing apparatus and an image processing method in which an object having a desired attribute, included in image data obtained by reading an image on a document, is capable of obtaining vectorized data.

According to an aspect of the present invention, an image processing apparatus includes a reading unit adapted to read an image and to generate image data representing the image; a separating unit adapted to separate the image data obtained by the reading unit into a plurality of objects corresponding to attributes; a selecting unit adapted to select a predetermined attribute of the image; a vectorization unit adapted to perform a vector conversion process for the image data separated by the separating unit in accordance with the predetermined attribute selected by the selecting unit; and an output unit adapted to output the image data processed by the vectorization unit.

According to another aspect of the present invention, an image processing method includes obtaining image data representing an image; separating the image data into a plurality of objects corresponding to attributes; selecting a predetermined attribute of the image; performing a vector conversion process for the image data separated in accordance with the predetermined attribute selected; and outputting the image data for which the vector conversion process is performed. According to yet another aspect of the present invention, a computer readable program stored in a storage medium includes instructions executable by a computer for performing the above-described method.

The above features and further features of the present invention will become apparent from the following description of the embodiments with reference to the attached drawings.

BRIEF DESCRIPTION OF THE DRAWINGS

FIG. 3 is a flowchart showing an overview of the entire process performed by the image processing system according to the first embodiment of the present invention.

FIGS. 4A to 4C illustrate examples of operation screens according to the first embodiment of the present invention.

FIG. 6 includes tables showing examples of block information according to the first embodiment of the present invention.

FIGS. 19A to 19C show examples of operation screens according to the third embodiment of the present invention.

FIGS. 20A to 20D show examples of operation screens according to the third embodiment of the present invention.

DESCRIPTION OF THE EMBODIMENTS

Embodiments of the present invention will be described with reference to the attached drawings.

First Embodiment

Figure 1:
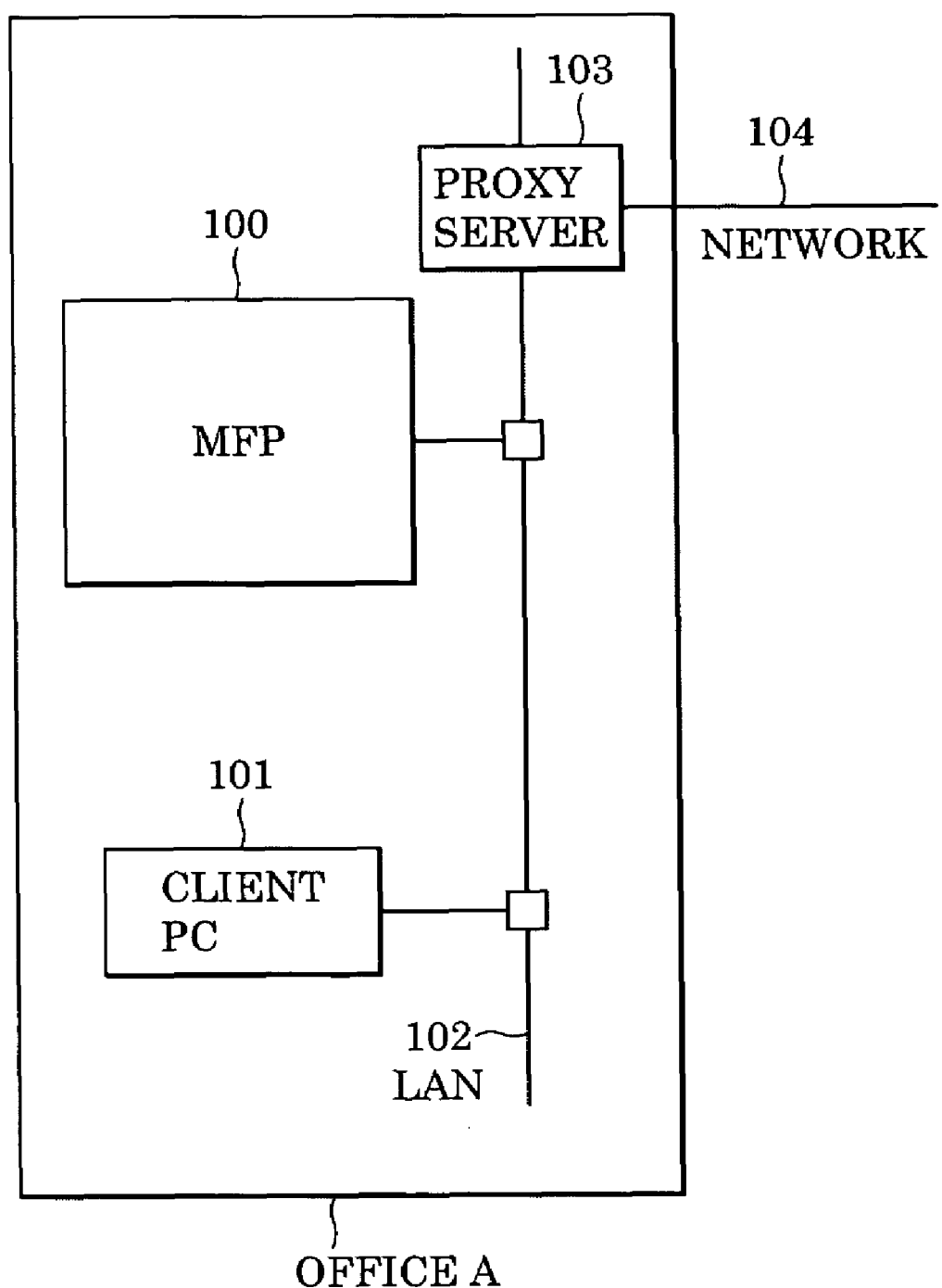
FIG. 1 is a block diagram of an image processing system according to a first embodiment of the present invention.

FIG. 1 is a block diagram of an image processing system according to a first embodiment of the present invention.

Referring to FIG. 1, a multifunction peripheral (MFP) 100, a client PC 101, and a proxy server 103 are connected to a local area network (LAN) 102 provided in an office A. The MFP 100 is a complex machine that performs multiple functions including a copy function, a print function, a file transmission function, and a fax transmission function. The client PC 101 receives data transmitted from the MFP 100 or utilizes the functions performed by the MFP 100. The LAN 102 is connected to a network 104 through the proxy server 103.

The MFP 100 can print a printed material based on, for example, print data transmitted from the client PC 101.

The structure shown in FIG. 1 is only an example, and a plurality of offices, each having the components similar to those in the office A, may be connected to the network 104.

The network 104 is typically a so-called telecommunication network, such as the Internet, a LAN, a wide are network (WAN), a telephone line, a dedicated digital line, an asynchronous-transfer-mode line, a frame relay line, a communication satellite line, a cable television line, a radio communication line for data broadcasting, or a combination of these lines. The network 104 may be any network as long as it can transmit and/or receive data.

Various terminals of the client PC 101 and the proxy server 103 each include standard components (for example, a central processing unit (CPU), a random access memory (RAM), a read-only memory (ROM), a hard disk, an external storage device, a network interface, a display, a keyboard, and a mouse) provided in a general-purpose computer.

The structure of the MFP 100 will now be described in detail with reference to FIG. 2.

Figure 2:
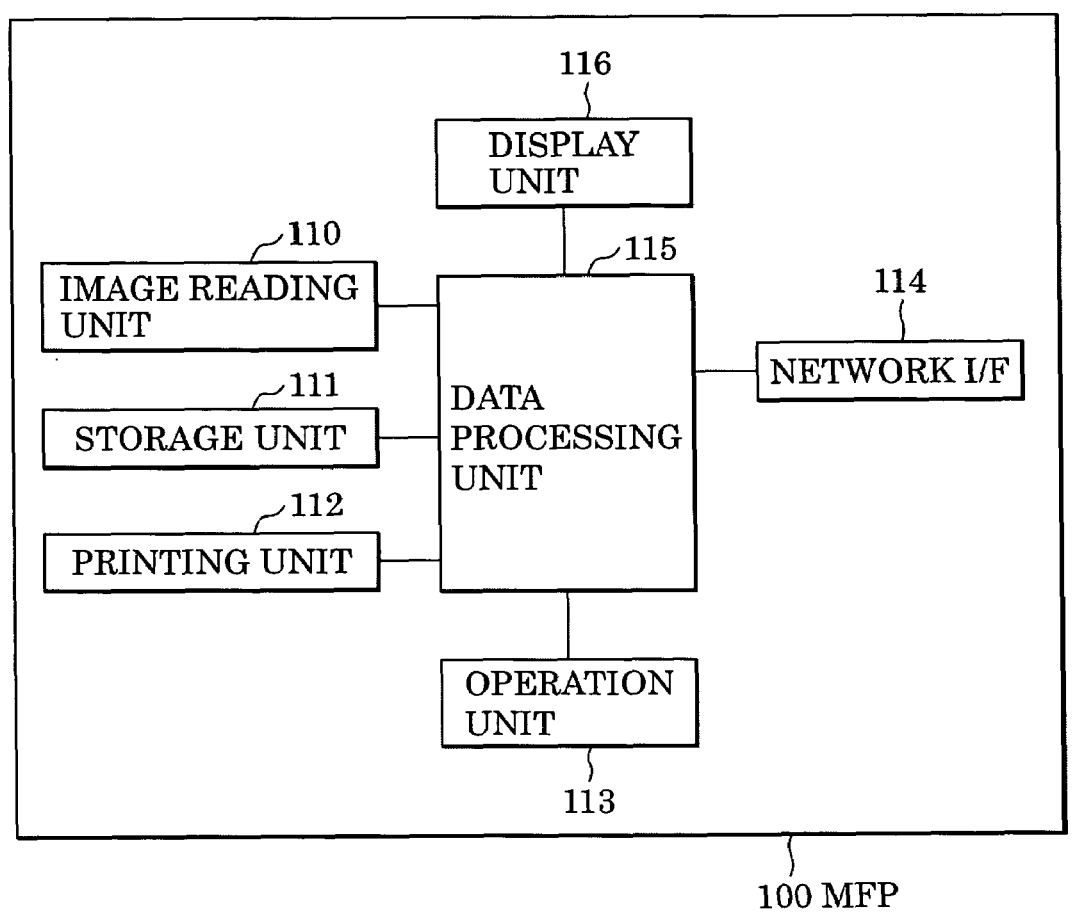
FIG. 2 is a block diagram of a multifunction peripheral (MFP) according to the first embodiment of the present invention.

FIG. 2 is a block diagram of the MFP 100 according to the first embodiment of the present invention.

Referring to FIG. 2, images on a batch of documents or on a document are irradiated with a light source (not shown), the images reflected from a lens (not shown) focus on a solid-state image sensing device (not shown), and an image reading unit 110 including an automatic document feeder (ADF) reads raster image signals from the solid-state image sensing device as image information (raster images) having a predetermined density (for example, 600 dots per inch (dpi)).

The MFP 100 has a copy function of printing the image corresponding to the read image signal on a recording medium in a printing unit 112. When one document image is copied, the read image signal is processed in a data processing unit 115 to generate a recording signal that is printed on the recording medium in the printing unit 112. In contrast, when multiple document images are copied, the recording signals corresponding to one page are temporarily stored in a storage unit 111, the stored recording signals are sequentially output to the printing unit 112, and the output recording signals are printed on the recording medium in the printing unit 112. In the data processing unit 115 including a CPU, a ROM, and a RAM, the RAM loads a program stored in the ROM and the CPU executes the program to control a process shown in a flowchart described below.

In the transmission through a network interface (I/F) 114, the image signals supplied from the image reading unit 110 are converted into an image file in an image compression file format, such as a tag image file format (TIFF) or a Joint Photographic Experts Group (JPEG) format, or in a vector data file format, such as a PDF, and the converted image file is output through the network I/F 114. The output image file is transmitted to the client PC 101 through the LAN 102 or is transferred to an external terminal (for example, another MFP or another client PC) over the network 104.

In the printing in the printing unit 112, for example, print data output from the client PC 101 is supplied to the data processing unit 115 through the network I/F 114. The data processing unit 115 causes the printing unit 112 to convert the print data into raster data capable of being printed and to form an image on a printing medium.

An operator inputs his/her instructions into the MFP 100 through an operation unit 113 such as a key operation unit and a display unit 116 such as a touch panel, which are included in the MFP 100. The operation sequence is controlled by the CPU in the data processing unit 115. A status of the operator's input and image data during processing are displayed in the display unit 116.

The storage unit 111 is, for example, a high-capacity hard disk. The storage unit 111 has a database for storing and managing the image data read by the image reading unit 110 and the image data transmitted from the client PC 101.

Particularly, according to the present invention, the image data can be managed in association with a vector data file provided by vectorizing the image data. Depending on the application or purpose, the MFP 100 may be structured so as to manage at least one of the image data and the vector data file.

Summary of Processing

An overview of the entire process performed by the image processing system of the first embodiment is described next with reference to FIG. 3.

FIG. 3 is a flowchart showing an overview of the entire process performed by the image processing system according to the first embodiment of the present invention.

In Step S121, after a document is set in the image reading unit 110 in the MFP 100, the process selects a vector scan based on an operation by using a vector scan selection key provided in the operation unit 113.

The vector scan means a sequence of processes for performing vector conversion for the input image data (raster image data) in the read document image. A character area in the input image data is converted into a Text code, and fine lines and graphic areas in the input image data are encoded using functions. In other words, the process of scanning a document and converting the scanned input image data into vector data is defined as the vector scan. The vector conversion step performed in the vector scan is described in detail below with reference to FIGS. 5A and 5B and the subsequent figures.

Referring back to FIG. 3, in Step S122, the process selects a desired vector mode by using a vector mode selection key based on the operation through the operation unit 113.

The operation relating to the vector scan performed by using the operation unit 113 is described in detail below with reference to FIGS. 4A to 4C.

After a start key is operated to activate the vector scan, in Step S123, the process reads an image on the document set in the image reading unit 110 and activates the vector scan in a specified vector mode.

In the vector scan, first, one document is scanned and read in a raster pattern to obtain an image signal of, for example, 60 dpi and eight bits. In Step S124, the process performs preprocessing for the image signal in the data processing unit 115 and stores the processed image signal as image data corresponding to one page in the storage unit 111.

The CPU in the data processing unit 115 performs preprocessing for the vector conversion for the image data stored in the storage unit 111 in Steps 125 and 126 and then performs the vector conversion for the processed data in Step S127.

In Step S125, the process performs block selection (BS) in the data processing unit 115.

Specifically, the process divides the image signal to be processed, which is stored in the storage unit 111, into a character/line-art area and a half-tone image area. The character/line-art area is further divided into blocks for every paragraph or into tables or graphics drawn by lines.

The half-tone image area is further divided into objects (blocks), such as image subareas or background subareas in a square block.

In this case, the attribute of an object to be divided is determined based on the vector mode selected in Step S122.

For example, when a Text/Graphic/Table/Image mode is specified as the vector mode, the image signal is divided into objects (blocks) having Text (character), Graphic (fine line and graphic), Table (table), Image (image), and BackGround (background) attributes. When a Text mode is specified as the vector mode, the image signal is divided into objects (blocks) having the Text (character) and BackGround (background) attributes.

In terms of the BackGround (background) attribute, for example, when the Text mode is specified, since areas other than the object having the Text (character) attribute have the BackGround (background) attribute, the BackGround (background) is not included in choices of the vector mode. The text mode may be denoted by a Text/BackGround mode.

Examples of the vector modes are described next.

1) Text/Graphic/Table/Image Mode

The image is divided into objects (blocks) having the Text (character), Graphic (fine line and graphic), Table (table), Image (image), and BackGround (background) attributes.

2) Text/Graphic/Image Mode

The image is divided into objects (blocks) having the Text (character), Graphic (fine line, graphic, and table), Image (image), and BackGround (background) attributes.

3) Text/Image Mode

The image is divided into objects (blocks) having the Text (character), Image (fine line, graphic, table, and image), and BackGround (background) attributes.

4) Text Mode

The image is divided into objects (blocks) having the Text (character) and BackGround (fine line, graphic, table, image, and background) attributes.

5) Image Mode

The image is divided into objects (blocks) having the Image (character, fine line, graphic, table, and image) and BackGround (background) attributes. Although the data in this mode is not converted into so-called vector data, the volume of data can be kept small while maintaining a certain level of image quality because different processing is performed for the data having the Image attribute and for the data having the BackGround attribute, as described below.

As described above, the vector mode defines the attributes of the objects divided by the block selection and also defines the attributes of the objects to which the vector conversion is applied. In other words, after the attributes of the objects are determined, the subsequent division method is changed to perform the vector conversion for the objects having desired attributes.

Although the Text (character), Graphic (fine line and graphic), Table (table), Image (image), and BackGround (background) attributes are exemplified in the first embodiment, the attributes are not limited to these attributes. Other attributes may be specified depending on the application or purpose. All the attributes may not necessarily be specified.

Although the Text/Graphic/Table/Image mode, the Text/Graphic/Image mode, the Text/Image mode, the Text mode, and the Image mode are exemplified as the vector mode in the first embodiment, the vector modes are not limited to these vector modes. Other vector modes may be specified depending on the application or purpose. All the vector modes may not necessarily be specified.

The vector conversion is performed for the entire input image information in each object (block) divided for every attribute to convert the image data into the vector data file.

Referring back to FIG. 3, in Step S126, the process performs optical character recognition (OCR) for the character block obtained by the block selection in Step S125.

In Step S127, the process recognizes the size, style, and font of characters in the character block that has been subjected to the OCR and converts the recognized data in the character block into font data visibly close to the character obtained by scanning the document. In contrast, the process performs outlining/function approximation for the table and graphic blocks drawn by lines. The process converts the image block into individual JPEG files as image data.

For example, when the Text/Graphic/Table/Image mode is specified in Step S122, the object having the Text (character) attribute is converted into the font data in Step S127. The object having the Graphic (fine line and graphic) attribute is subjected the vector conversion as the outlined and function-approximated function. In the object having the Table (table) attribute, numerical information in the table is converted into the font data and the table is subjected to the vector conversion as the outlined and function-approximated function. The numerical information is associated with each other as cell information and is coded as a table object.

The object having Image (image) attribute is subjected to low compression (for example, low JPEG compression) while maintaining a read resolution of 600 dpi in the image reading unit 110 and is stored. The object having BackGround (background) attribute is subjected to high compression (for example, high JPEG compression) after the read resolution 600 dpi is changed to a low resolution (for example, a resolution of 300 dpi), and is stored.

The low compression is defined as compression at a compressibility lower than a predetermined compressibility (for example, 50%), and the high compression is defined as compression at a compressibility higher than the predetermined compressibility.

When the Text mode is specified in Step S122, the object having the Text (character) attribute is converted into the font data in Step S127. The remaining objects having the Graphic (fine line and graphic), the Table (table), and the Image (image) attributes are processed in the same manner as in the object having the BackGround (background) attribute. That is, these objects are subjected to the high compression and stored in the JPEG format after the resolution is changed to 300 dpi.

As described above, changing (controlling) the attribute to be processed in the vector conversion in a specified vector mode allows the capacity or image quality of the generated vector data file to be arbitrarily varied depending on the application or purpose.

After the vector conversion in Step S127 is completed, then in Step S128, the process stores the layout information of each object (block) as the vector data file in the storage unit 111.

In Step S129, the vector data file stored in the storage unit 111 is subjected to postprocessing depending on the purpose of the vector scan.

In the postprocessing for, for example, copying, image processing including color processing and spatial frequency correction, which is best suited for each object, is performed and the processed data is printed in the printing unit 112. In the postprocessing for file storage, the file is stored in the storage unit 111. In the postprocessing for file transmission, the file is converted into a general-purpose file format, such as a rich text format (RTF) or a scalable vector graphic (SVG)

format, which is a format capable of being reused in a target device, and is transmitted to the target (for example, the client PC 101) through the network I/F 114.

The vector data file obtained by the above process includes all vector information that is visibly closer to the read document image in an editable format. Such vector information can directly be processed or reused, or can be stored, transmitted, or re-printed.

Since the characters and fine lines are represented by descriptive codes in the vector data file generated in the above process, the amount of information is reduced, the storage efficiency is increased, and the transmission time is saved, compared with a case in which the image data (raster bitmap data) is simply and directly processed. In addition, the data in the vector data file has the big advantage of a high quality in the recording and display.

Advantages of the image processing system structured such that the attributes to which the vector conversion is applied are changed based on the vector mode are described next.

For example, when the Text/Graphic/Table/Image mode is specified as the vector mode to vectorize the image in order to vectorize only the part having the Text attribute in the image and to reuse it, parts other than the part having the Text attribute are also vectorized after the vector conversion and, therefore, the operation of extracting and using the part having the Text attribute becomes complicated. Accordingly, in such a case, specifying the Text mode as the vector mode automatically generates the vector data file in which only the part having the Text attribute is vectorized, so that it is easy to extract only the part having the Text attribute and to perform the postprocessing.

In the vector conversion without using the vector mode, for example, when the shape of the image is significantly varied from that of the original raster image after the vector conversion, the vector conversion for dividing the data into objects corresponding to all the attributes that can be discriminated in the image is ordinarily performed (according to the first embodiment, corresponding to the Text/Graphic/Table/Image mode). When such vector conversion varies the shape of the object having the Graphic and/or Table attribute, it is necessary to manually adjust the shape of the object having the Graphic and/or Table attribute after the vector conversion.

In contrast, according to the first embodiment, the Text/Image mode is provided as the vector mode. Accordingly, when the Text/Image mode is specified, the object having the Graphic or Table attribute is processed as the object having the Image attribute and the raster image of the object having the Graphic or Table attribute can be stored as the JPEG data without performing the vector conversion. In other words, when the vector data differs from the raster data in shape, as described above, only specifying the Text/Image mode as the vector mode can prevent a difference in shape from occurring between the original raster image and the vector data, thus increasing the convenience and improving the image quality with respect to matching with the raster data.

Varying the vector mode permits application of an optimal vector attribute to the object for every postprocessing in Step S129.

For example, the Text/Image mode is specified in the copying. In the Text/Image mode, only the characters are vectorized to improve the character quality, and the vector conversion is not performed for other objects in order to place a high value on the fidelity to the original document. In the file transmission, the Text/Graphic/Table/Image mode is specified in consideration of the reusability of each vectorized object in, for example, the target client PC 101. In this manner, it is possible to select an optimal vector mode depending on the application or purpose for every postprocessing.

Description of Operation Unit 113 and Display Unit 116

Figure 4A:
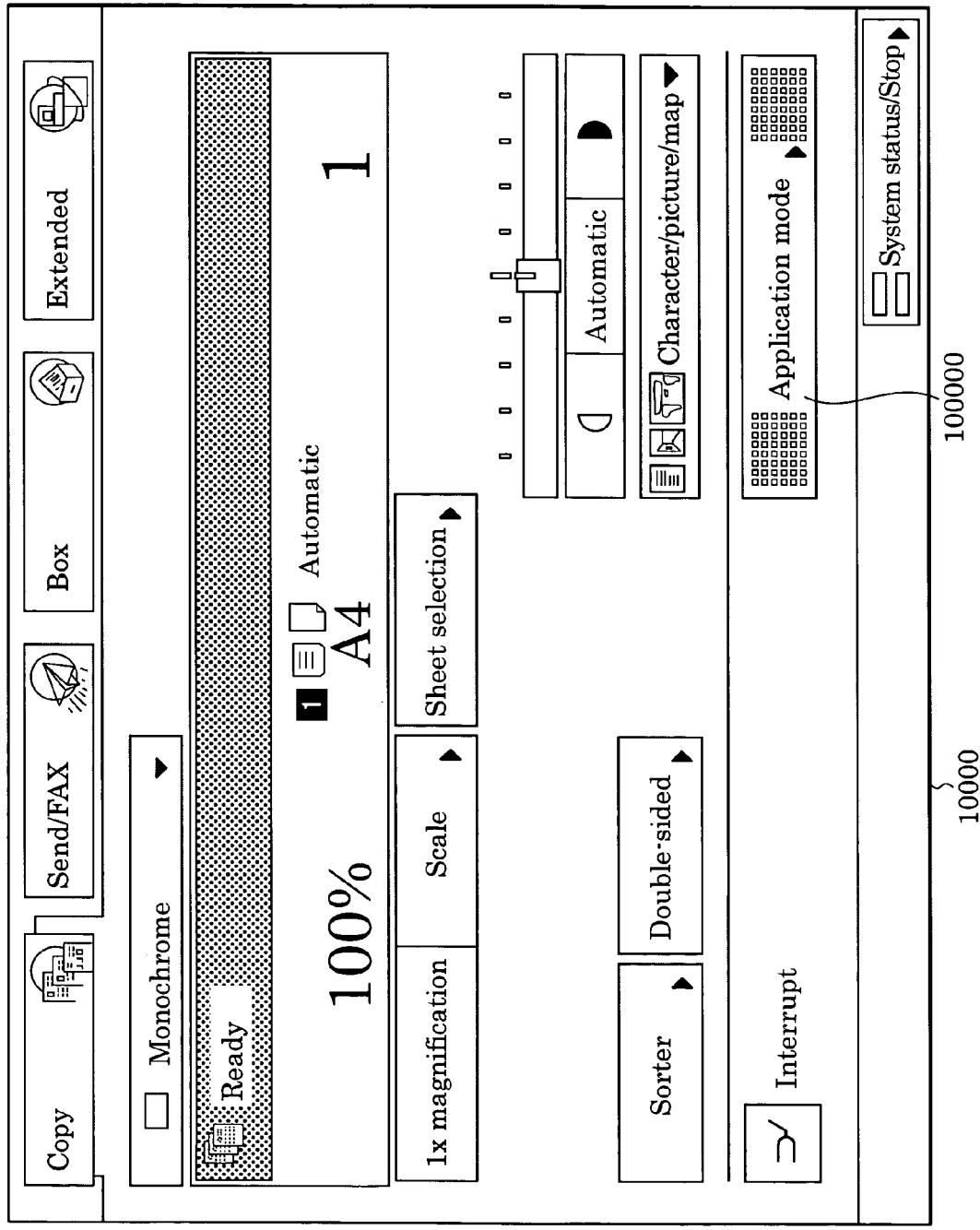

FIGS. 4A to 4C illustrate examples of operation screens according to the first embodiment of the present invention.

Particularly, these operation screens are examples of operation screens corresponding to the operation unit 113 and the display unit 116.

The exemplary screens shown in the figures, such as FIGS. 4A to 4C, are structured so as to integrate the operation unit 113 and the display unit 116 therewith. Although the operation unit 113 and the display unit 116 are a touch panel and a liquid crystal display (LCD) in these examples, the operation unit 113 may be a separate hard key or mouse pointer and the display unit 116 may be a separate cathode ray tube (CRT) or the like.

The operation screen 10000 in FIG. 4A is a basic operation screen of the MFP 100 of the first embodiment. Selection of the vector scan function in the first embodiment is performed by using an application mode key 100000 on the operation screen 10000.

Pressing the application mode key 100000 switches the operation screen 10000 to an application mode screen 10001 shown in FIG. 4B, which has various modes provided in the MFP 100 as application modes.

The application mode screen 10001 shown in FIG. 4B includes a Vectorize key 100010 which is a selection key that activates the vector scan function described above (in Step S121 in FIG. 3). Pressing the Vectorize key 100010 displays an operation screen 10002 shown in FIG. 4C.

On the operation screen 10002, a Start reading key 100020 is a key for instructing the start of scanning for reading the document. Pressing the Start reading key 100020 causes the image processing system to read the document. A vector mode selection key 100021 is a key for selecting the vector mode described above. After the vector mode is selected (Step S122 in FIG. 3), the Start reading key 100020 is pressed to start the scan operation.

The operation screen 10002 shown in FIG. 4C also includes a vector mode selection key 100021 which causes the content (vector mode) to be switched each time the vector mode selection key 100021 is pressed. Although any of the modes, e.g., Text/Graphic/Table/Image mode, Text/Graphic/Image mode, Text/Image mode, Text mode, and Image mode, can be selected on this operation screen, as described above, the method of selecting the vector mode is not limited to this.

For example, there may be a check box for each of the available attributes (Text, Graphic, Table, and Image) which can be checked in any combination selected by an operator. In this case, when the operator checks the Text and the Image, a mode similar to the Text/Image mode is performed. Alternatively, a pulldown menu including various vector modes may be structured and the operator may select a desired vector mode from the pulldown menu.

The block selection in Step S125 in FIG. 3 is described in detail next.

Figure 5A:
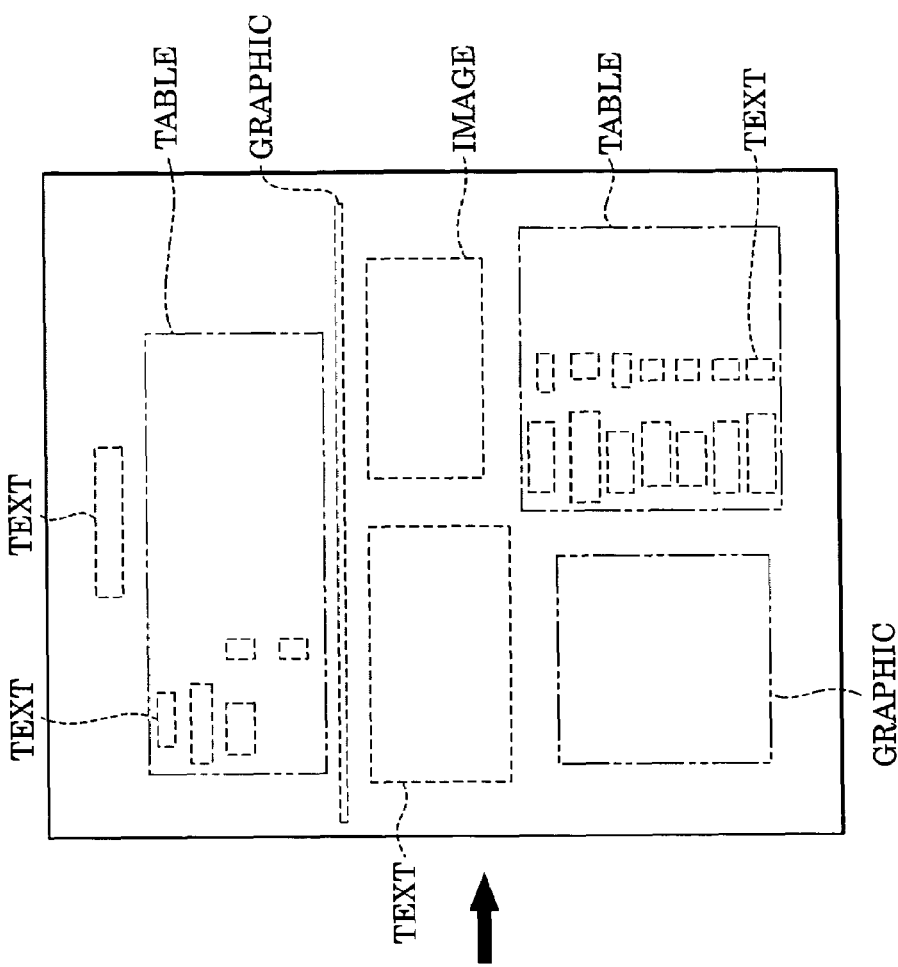
FIGS. 5A and 5B illustrate the concept of block selection according to the first embodiment of the present invention.
Figure 5B:
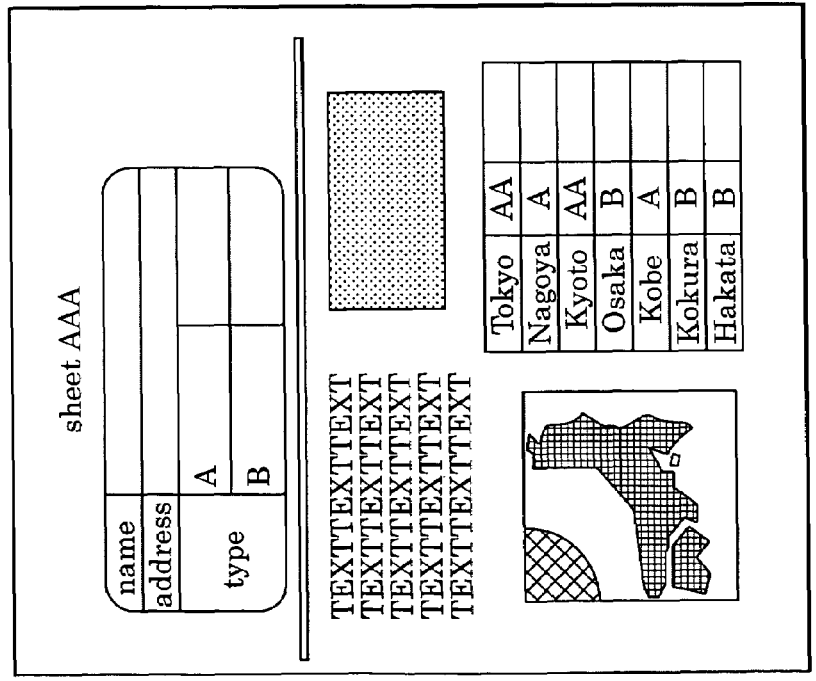

The block selection is a process for recognizing, for example, a raster image, such as the one shown in FIG. 5A, as meaningful blocks, as shown in FIG. 5B, determining the attribute (Text/Graphic/Image/Table or others) of each block, and dividing the raster image into blocks having different attributes.

An embodiment of the block selection is described below.

First, the input image is binarized into black and white pixels, and a black-pixel outline is traced to extract blocks of pixels surrounded with the black-pixel outline. In large black-pixel blocks, a white-pixel outline is traced to extract blocks of pixels surrounded with the white-pixel outline. Furthermore, black-pixel blocks are recursively extracted from the white-pixel blocks having an area greater than a predetermined area.

The black-pixel blocks obtained in this manner are classified into sub-blocks based on their size and shape to obtain blocks having different attributes. For example, a block having an aspect ratio close to one and having a size within a predetermined range is classified into a pixel block corresponding to a character; a part in which adjacent characters are arranged in line and which can be grouped is classified into a character block; a flat pixel block is classified into a line block; a range occupied by black-pixel blocks having a size greater than a predetermined size and having rectangular white-pixel blocks arranged in line is classified into a table block; an area in which indeterminate pixel blocks are scattered is classified into a picture block; and other pixel blocks having arbitrary shapes are classified into graphic blocks.

In the block selection, a block ID identifying each block is issued, each block is associated with the attribute (image, character, etc.), size, position (coordinate) in the original document of each block, and the associated data is stored as block information in the storage unit 111. The block information is utilized in the vector conversion in Step S127 described in detail below.

Examples of the block information are described next with reference to FIG. 6.

FIG. 6 includes tables showing examples of block information according to the first embodiment of the present invention.

As shown in FIG. 6, the block information includes a block attribute (1:TEXT, 2:GRAPHIC, 3:TABLE, 4:IMAGE) indicating the attribute of each block, a position coordinate (X, Y) of the block, a width W and height H of the block, and the presence of OCR information (text data) concerning the block.

The position coordinate (X, Y) of the block is a position coordinate when the upper left corner of the document image is set to the origin (0, 0). The width W and height H are, for example, represented by the number of pixels. In the block selection, in addition to the block information, input file information indicating the number of blocks N existing in the document image (input file) is generated. In the example shown in FIG. 6, the input file information N equals 6.

The OCR in Step S126 in FIG. 3 is described in detail next. A known OCR technology is used here to perform character recognition process.

"Character Recognition Process"

In the character recognition process, the character recognition is performed for a character image cut out from the character block in units of characters by using a pattern matching method to obtain the corresponding character code. Particularly, the character recognition process compares an observed characteristic vector that is given by converting the characteristic obtained from the character image into a numeric string having a several-tens-number of dimensions with a dictionary characteristic vector that has been provided for every character type to produce a character type that is closest to the dictionary character vector as the recognition result.

Various known methods are used to extract the characteristic vector. In one of the methods, the character is divided into a mesh pattern, and a vector having dimensions corresponding to the number of meshes, which is given by counting character lines in each mesh block for every direction as line elements, is used as the characteristic vector.

In order to perform the character recognition process for the character block, first, it is determined whether the character block is horizontally written or vertically written, a character string is cut out in the corresponding direction, and the characters are then cut out from the character string to obtain the character image.

In the determination of the horizontal writing or the vertical writing, horizontal or vertical projection with respect to a pixel value is obtained in the character block. When the horizontal projection is widely varied, it is determined that the corresponding character block is horizontally written. When the vertical projection is widely varied, it is determined that the corresponding character block is vertically written. In the division into the character string and the characters, when the character block is horizontally written, the horizontal projection is used to cut out a line and characters are cut out from the vertical projection with respect to the cut-out line. In contrast, when the character block is vertically written, a reversed process with respect to the horizontal writing is performed.

The sizes of the characters are also detected in the character recognition process.

The vector conversion in S127 in FIG. 3 is described in detail next.

First, font recognition process is performed for each character in the character block obtained by the OCR in Step S126.

"Font Recognition Process"

The dictionary characteristic vectors corresponding to the number of character types, for use in the character recognition process, are provided for every character shape, that is, for every font type. The font type is output along with the character code in the matching to recognize the font of the character.

"Vector Conversion of Character"

The information concerning the characters is converted into vector data, based on outline data that has been prepared in advance, by using the character codes obtained by the character recognition process and the font information obtained by the font recognition process. When the document image is a color image, the color of each character, which is extracted from the color image, is recorded along with the vector data.

Through the process described above, image information concerning the character block can be converted into the vector data having the shape, size, and color approximately faithful to those of the document image.

"Vector Conversion of Parts Other Than Characters"

As for the graphic, line, or table blocks other than the character block, the outline of the pixel block extracted from the corresponding block is converted into the vector data.

Figure 7:
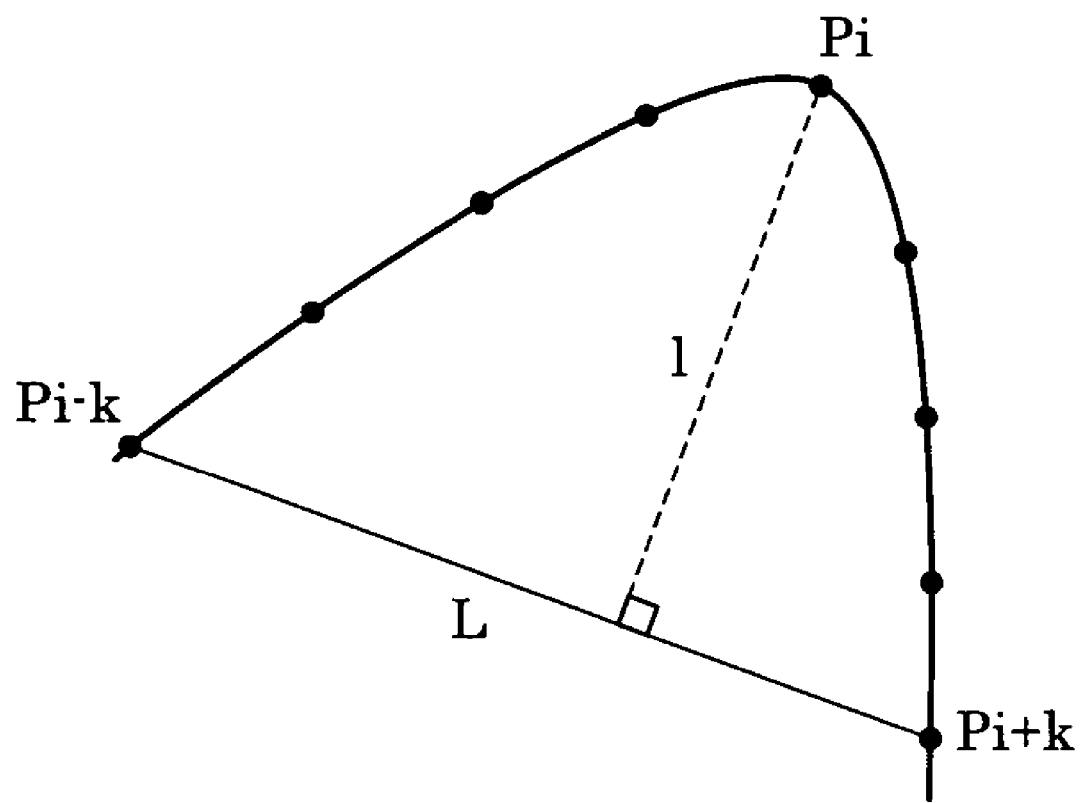
FIG. 7 illustrates vector conversion according to the first embodiment of the present invention.

Specifically, the sequence of points of the pixels forming the outline is delimited at points considered to be angles, and the delimited sections are approximated to a partial straight line or curved line. The angles are points having maximal curvatures. When a chord is drawn between a point Pi−k and a point Pi+k and the points Pi−k and the Pi+k are respectively apart from an arbitrary point Pi by k-number of arcs, as shown in FIG. 7, a point having a maximal curvature is a point having a maximal distance between the chord and the point Pi.

When the result of division of the length of the chord between the point Pi−k and the point Pi+k by the total length of the arcs is represented by R, a point having a value R smaller than a threshold value is considered to be an angle. After the sections are divided by the angle, straight lines can be vectorized by using a computation expression, such as a least squares method, with respect to the sequence of points, and curved lines can be vectorized by using a cubic spline function or the like.

When an object has an inner outline, the sections are approximated to a partial straight line or curved line by using the sequence of points of the white-pixel outline extracted by the block selection.

As described above, the section-line approximation of the outline can be used to vectorize the outline of a graphic having an arbitrary shape. When the document image is a color image, the color of each graphic, which is extracted from the color image, is recorded along with the vector data.

Figure 8:
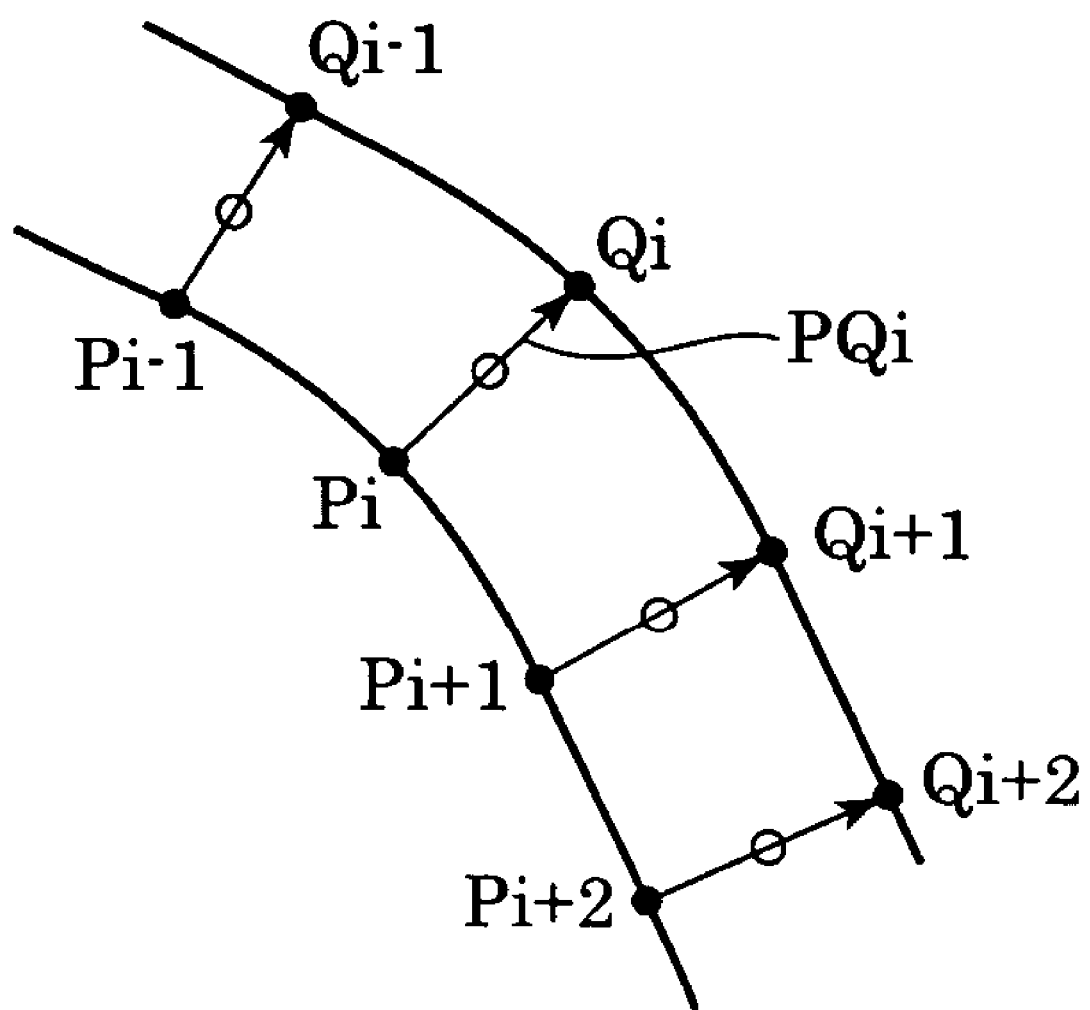
FIG. 8 illustrates the vector conversion according to the first embodiment of the present invention.

When an outer outline is adjacent to an inner outline or another outer outline in one section, as shown in FIG. 8, the two outlines can be expressed as a line having a certain width by putting the two lines together.

Specifically, when lines are drawn from points Pi−1, Pi, Pi+1, and Pi+2 on one outline to points Qi−1, Qi, Qi+1, and Qi+2 on another outline, which have the shortest distances from the points Pi−1, Pi, Pi+1, and Pi+2, respectively, and an average of the distances PQi is smaller than a predetermined length, the medians of the distances PQi are approximated to a straight line or curved line as the sequence of points in the target section and the width of the line is set to an average value of the distances PQi. Ruled lines in a table, which is lines or an aggregate of lines, can efficiently be represented by vectors as an aggregate of lines having certain widths.

The character closest to the dictionary characteristic vector is used as the result of recognition in the vector conversion using the character recognition process performed for the character block. However, when the distance from the dictionary characteristic vector is greater than a predetermined value, the character does not necessarily coincide with the original character and it is often the case that a characteristic having a similar shape is erroneously recognized.

Hence, according to the first embodiment, such character block is processed in the same manner as in the general line art and the character block is outlined. In other words, even characters that can cause erroneous recognition in a known character recognition process are not vectorized into wrong characters and, therefore, it is possible to perform the vector conversion using the outlining process, which produces the vector data that is visibly faithful to the image data.

The image block is processed as the image data, and the vector conversion is not performed for the image block.

A grouping process in which the vector data obtained by the vector conversion is grouped for every graphic block will now be described with reference to FIG. 9.

Figure 9:
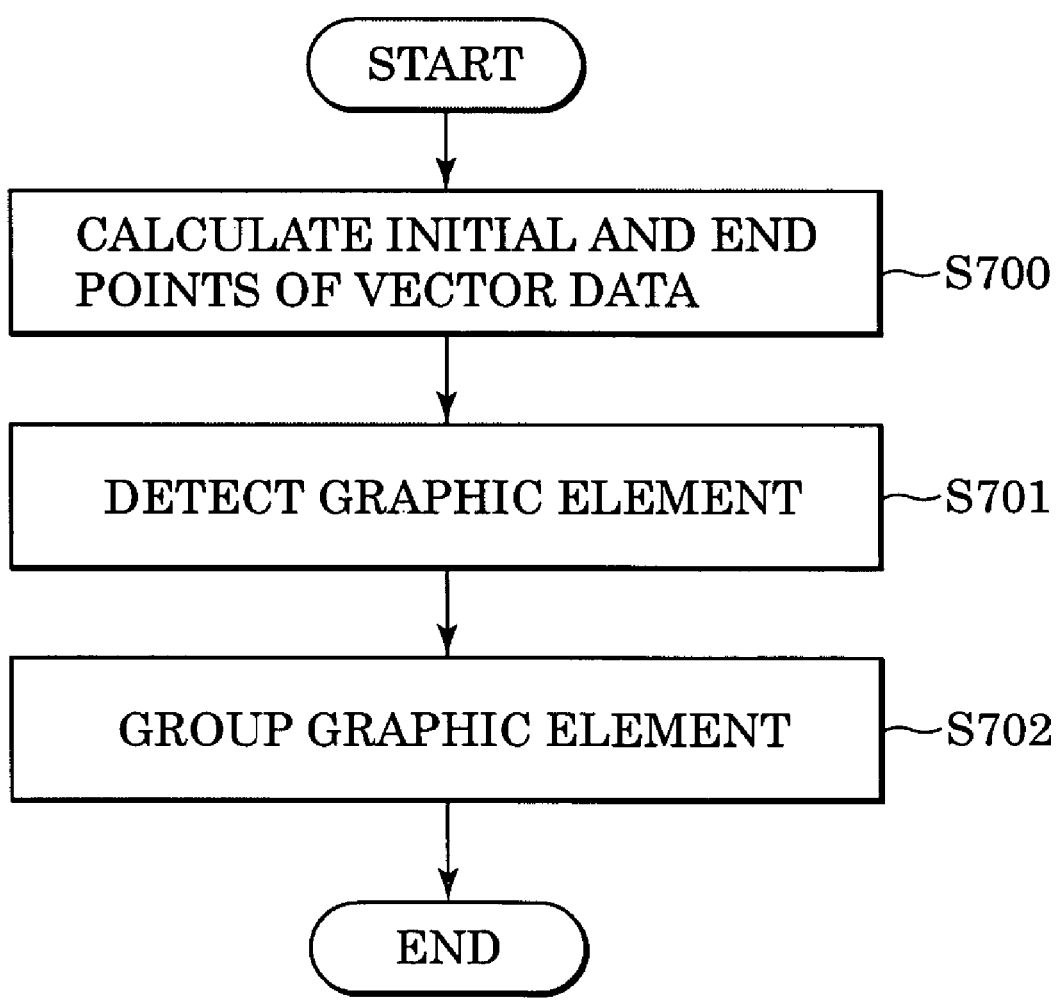
FIG. 9 is a flowchart showing a process of grouping vector data according to the first embodiment of the present invention.

FIG. 9 is a flowchart showing a process of grouping the vector data according to the first embodiment of the present invention.

In Step S700, the process calculates the initial and end points of each vector data. In Step S701, the process detects a graphic element by using the information concerning the initial and end points of each vector data.

The detection of the graphic element here means detecting a closed graphic formed by section lines. A principle in that each vector forming a closed shape has connected vectors at its opposing ends is applied to the detection.

In Step S702, the process groups other graphic elements existing in the detected graphic element or the section lines to form a graphic object. If the other graphic elements or the section lines do not exist in the detected graphic element, the graphic element is processed as a graphic object.

The detection of the graphic element in Step S701 in FIG. 9 is described in detail next with reference to FIG. 10.

Figure 10:
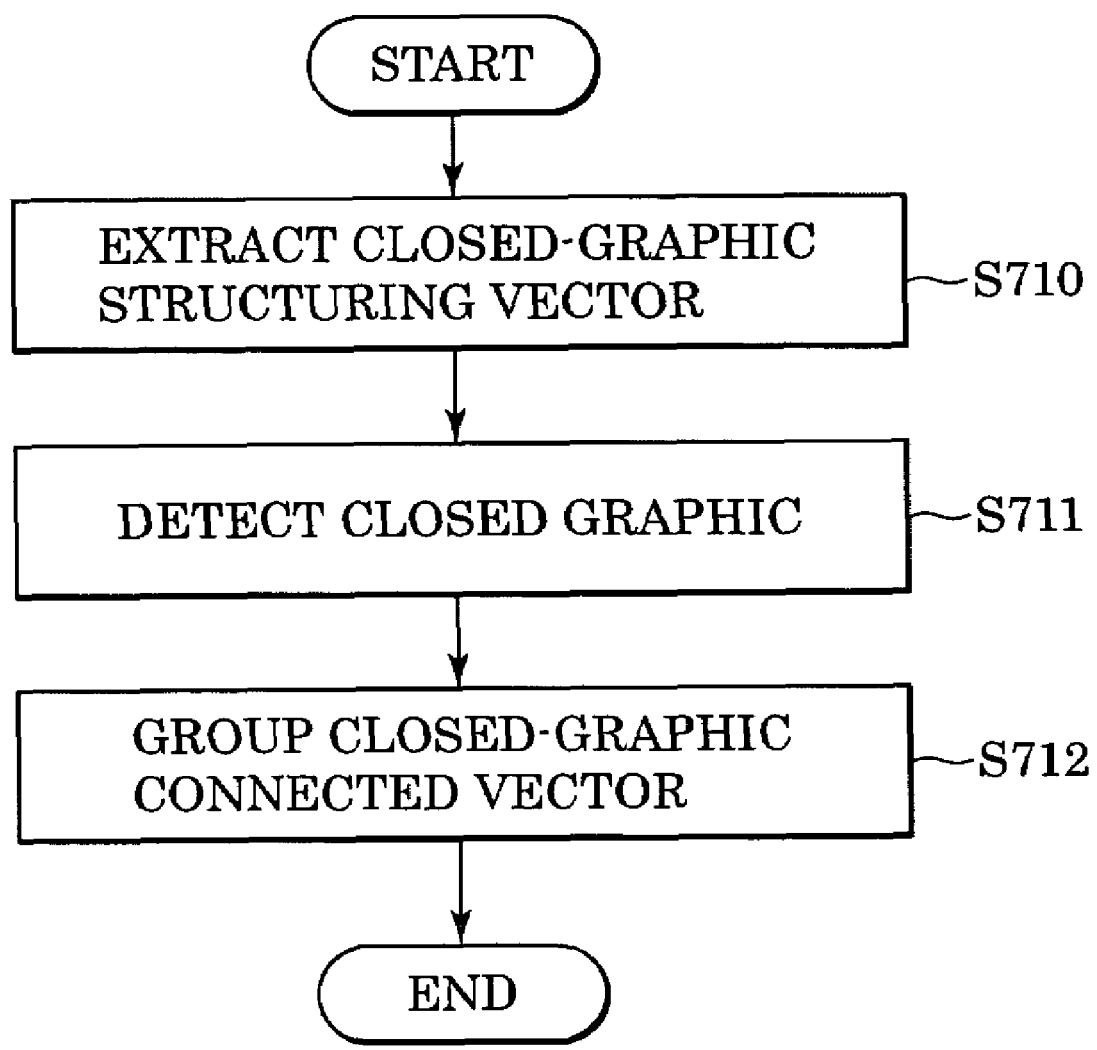
FIG. 10 is a flowchart showing in detail a process of detecting a graphic element according to the first embodiment of the present invention.

FIG. 10 is a flowchart showing in detail the process of detecting the graphic element in Step S701 according to the first embodiment of the present invention.

In Step S710, the process deletes unnecessary vectors that do not have the connected vectors at their opposing ends from the vector data to extract closed-graphic structuring vectors.

In Step S711, the process sequentially traces the closed-graphic structuring vectors clockwise from a starting point that is set to the initial point of the corresponding vector. The trace is continued until the trace returns to the starting point and all the vectors passed through are grouped into a closed graphic forming one graphic element. In addition, all the closed-graphic structuring vectors in the closed graphic are grouped. The same step is repeated from a starting point set to the initial point of a vector that has not been grouped.

In Step S712, from among the unnecessary vectors deleted in Step S710, the process detects vectors connected to the vectors grouped as the closed graphic in Step S711 (closed-graphic connected vectors) to group the detected vectors into one graphic element.

The above process allows the graphic block to be processed as a separate graphic object that can separately be reused.

Figure 11:
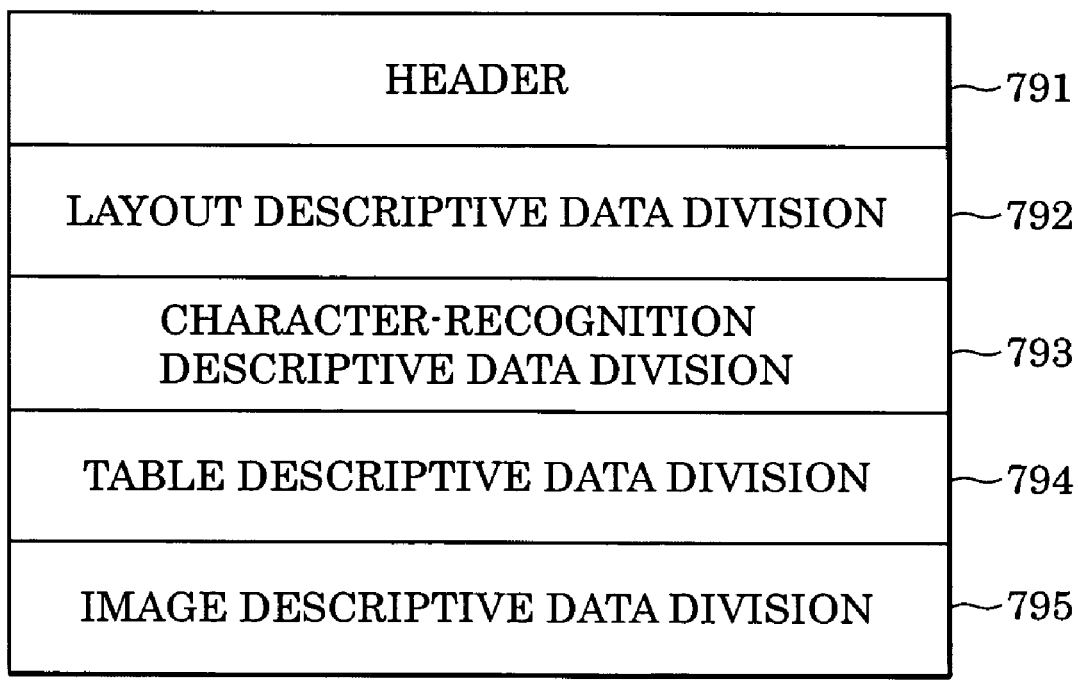
FIG. 11 illustrates the data structure in a document analysis output format (DAOF) according to the first embodiment of the present invention.

The data obtained by the block selection in Step S125, the OCR in Step S126, and the vector conversion in Step S127, which are shown in FIG. 3, is converted into a file in an intermediate data format shown in FIG. 11. Such a data format is called a document analysis output format (DAOF).

The data structure in the DAOF is described next with reference to FIG. 11.

FIG. 11 illustrates the data structure in the DAOF according to the first embodiment of the present invention.

Referring to FIG. 11, a header 791 stores information concerning the document image to be processed. A layout descriptive data division 792 stores the attribute information of each block recognized for every attribute in the document image and rectangular address information of the block. The attributes include Text (character), Title (title), Caption (caption), Lineart (line art), Picture (natural picture), Frame (frame), and Table (table).

A character-recognition descriptive data division 793 stores the character recognition result obtained by recognizing the Text block having an attribute of Text, Title, Caption, or the like.

A table descriptive data division 794 stores a detailed structure of the Table block. An image descriptive data division 795 stores the cut-out image data of the Graphic, Image, and other blocks.

The DAOF is not only stored as the intermediate data but also converted into a file for storage. In the state of a file, individual objects (blocks) cannot be reused in a general document preparation application.

Hence, according to the first embodiment, an application-data conversion process of converting the DAOF into application data that can be used in a document preparation application is performed after the vector conversion in Step S128 in FIG. 3 or as part of the postprocessing in Step S129 in FIG. 3.

The application-data conversion process is described in detail next with reference to FIG. 12.

Figure 12:
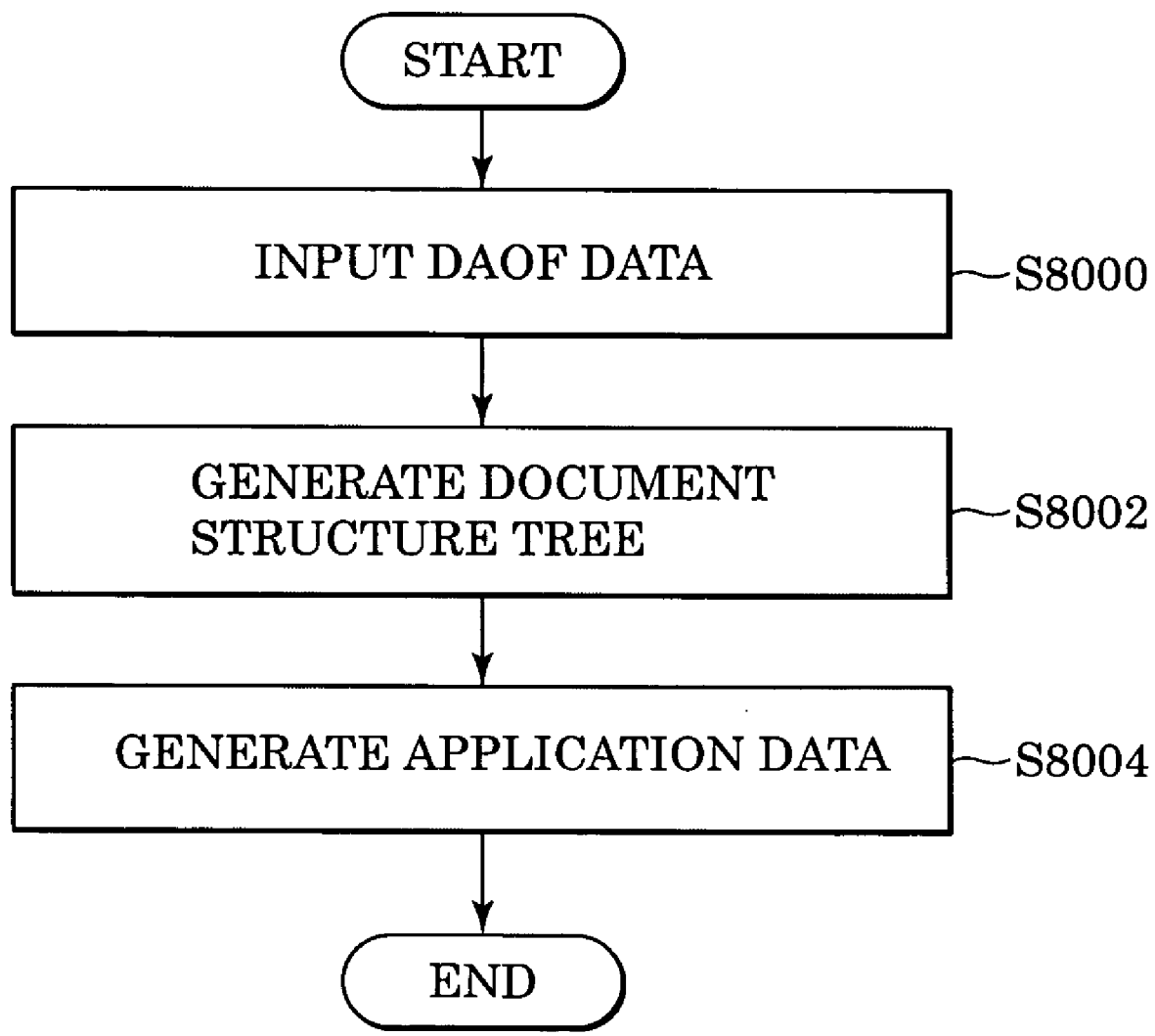
FIG. 12 is a flowchart showing an application-data conversion process according to the first embodiment of the present invention.

FIG. 12 is a flowchart showing the application-data conversion process according to the first embodiment of the present invention.

In Step S8000, the process inputs DAOF data. In Step S8002, the process generates a document structure tree on which the application data is based. In Step S8004, the process supplies real data in the DAOF based on the document structure tree to generate actual application data.

The process of generating the document structure tree in Step S8002 in FIG. 12 is described in detail next with reference to FIG. 13.

Figure 13:
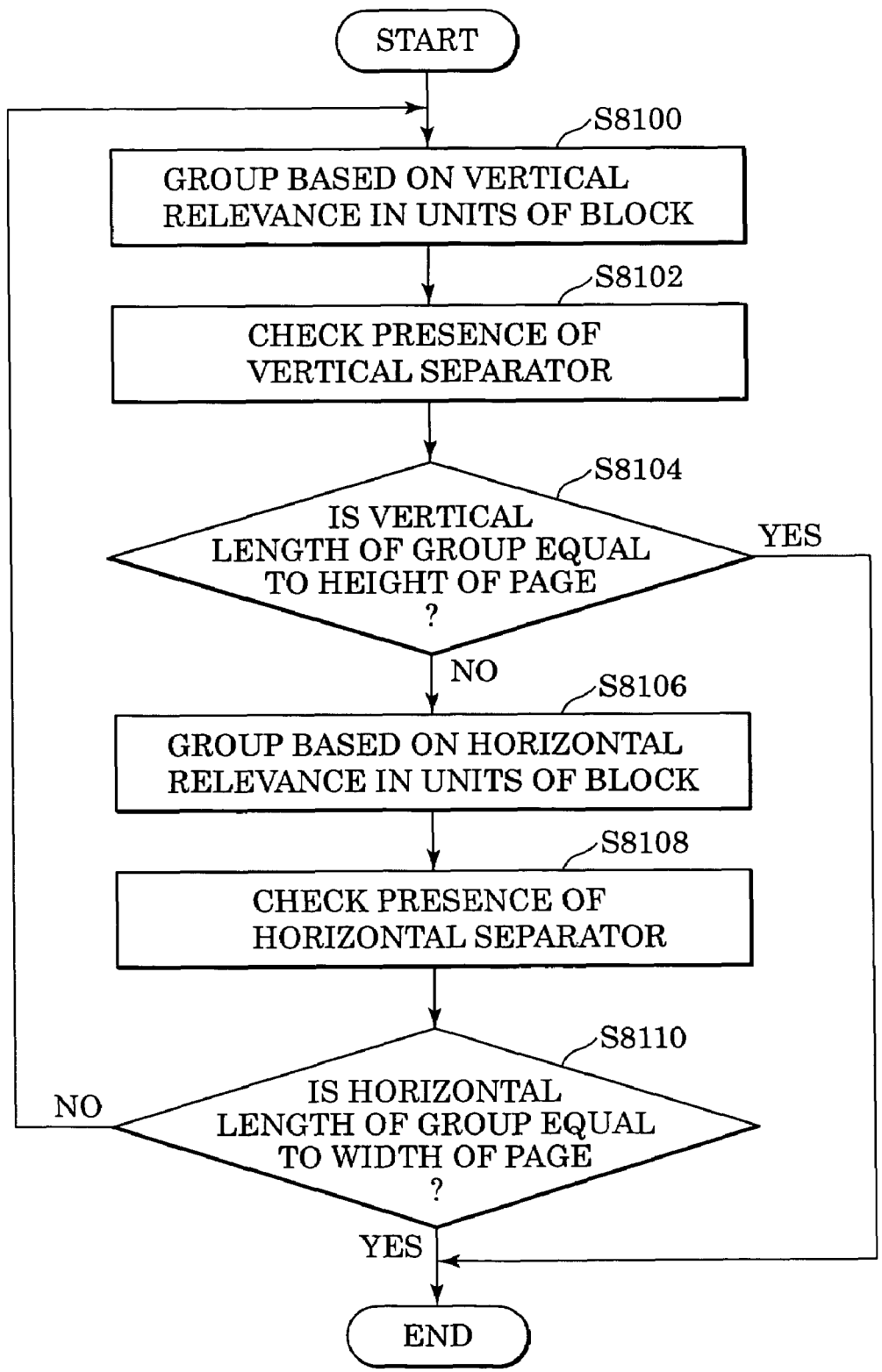
FIG. 13 is a flowchart showing in detail a process of generating a document structure tree according to the first embodiment of the present invention.

FIG. 13 is a flowchart showing in detail the process of generating the document structure tree in Step S8002 according to the first embodiment of the present invention. FIG. 14 includes diagrams illustrating the document structure tree according to the first embodiment of the present invention.

In the process shown in FIG. 13, the process flow moves from a micro block (single block) to a macro block (an aggregate of blocks) as a basic rule of the entire control.

The block hereinafter refers to both the micro block and the macro block.

Referring to FIG. 13, in Step S8100, the process performs re-grouping based on the vertical relevance in units of blocks.

Immediately after the process is started, the determination is performed in units of micro blocks.

The relevance here is defined as, for example, being close to each other or having approximately the same block width (horizontally, approximately the same block height). The information concerning the distance, width, height, and the like is extracted with reference to the DAOF.

Figure 14A:
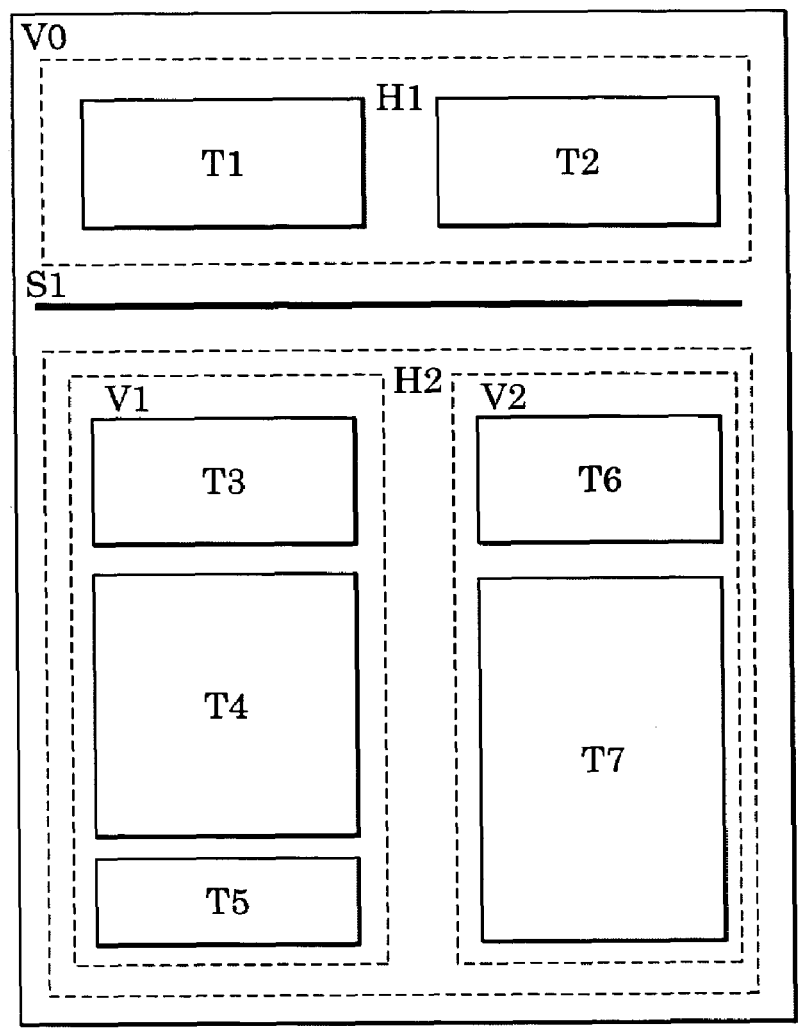
FIGS. 14A to 14B are diagrams illustrating a document structure tree according to the first embodiment of the present invention.
Figure 14B:
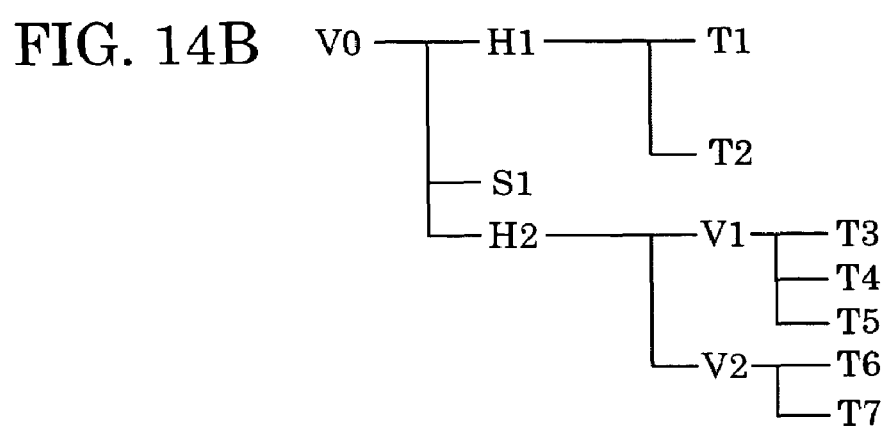

For example, FIG. 14A shows the page structure of an actual document image and FIG. 14B shows the document structure tree of the page structure in FIG. 14A. In Step S8100, blocks T3, T4, and T5 form one group V1 and blocks T6 and T7 form one group V2, which has the same hierarchy level as the group V1.

In Step S8102, the process checks the presence of a vertical separator. The separator physically means, for example, a block having a line attribute in the DAOF and logically means an element that explicitly divides the block in the document preparation application. When the separator is detected, the block is re-divided in the same hierarchy level.

In Step S8104, the process determines whether additional vertical division is performed based on the vertical length of the group. Specifically, the process determines whether the vertical length of the group is equal to the page height of the document image. If the vertical length of the group is equal to the page height (the determination is affirmative in Step S8104), the process is terminated. If the vertical length of the group is not equal to the page height (the determination is negative in Step S8104), the process proceeds to Step S8106.

Since the document image in FIG. 14A has no vertical separator and the vertical length of the group is not equal to the page height, the process proceeds to Step S8106.

In Step S8106, the process performs re-grouping based on the horizontal relevance in units of block. Immediately after the process is started, the determination is performed in units of micro blocks, as in Step S8100. The definition of the relevance and the determination information is the same as in the vertical determination.

In the document image shown in FIG. 14A, blocks T1 and T2 form one group H1 and blocks V1 and V2 form one group H2. The blocks H1 and H2 are in the same hierarchy level that is higher than the hierarchy level of the groups V1 and V2.

In Step S8108, the process checks the presence of a horizontal separator. Since S1 denotes a horizontal separator in FIG. 14A, the horizontal separator S1 is registered in the document structure tree to form a hierarchy level including H1, S1, and H2.

In Step S8110, the process determines whether additional horizontal division is performed based on the horizontal length of the group. Specifically, the process determines whether the horizontal length of the group is equal to the page width of the document image.

If the horizontal length of the group is equal to the page width (the determination is affirmative in Step S8110), the process is terminated. If the horizontal length of the group is not equal to the page width (the determination is negative in Step S8110), the process goes back to Step S8100 to repeat the process from Step S8100 in the upper hierarchy level.

Since the horizontal length of the group is equal to the page width in FIG. 14A, the process is completed in Step S8110. Finally, the highest hierarchy level V0, representing the entire page, is added to the document structure tree.

After the document structure tree is completed, the application data is generated in Step S8004 in FIG. 12 based on the document structure tree.

In the case of FIGS. 14A and 14B, the application data is specifically generated in the following manner.

Since the block H1 horizontally includes the two blocks T1 and T2, the blocks T1 and T2 are output as two columns. Information inside the block T1 (refer to the DAOF; sentences, images, and the like as a result of the character recognition) is output. Next, the column is changed and information inside the block T2 is output. Then, the horizontal separator S1 is output.

Since the block H2 horizontally includes the two blocks V1 and V2, the blocks V1 and V2 are output as two columns. As for the block V1, information inside the blocks T3, T4, and T5 is sequentially output. Next, the column is changed and information inside the blocks T6 and T7 in the block V2 is output.

The process of converting the DAOF into the application data is performed in the manner described above.

Depending on the vector mode specified in the operation unit 113, the block having a desired attribute is postprocessed as vector data and the remaining blocks are postprocessed as images or the background.

As described above, according to the first embodiment, when the read document image is to be vectorized, the content of processing in the vector conversion can appropriately be changed depending on the application or purpose. Accordingly, when various processes (printing, transmission, storage, and so on) based on the document image are to be performed, the vector data file having a structure appropriate for the content of processing can be used to realize the processing.

Second Embodiment

In the structure of the image processing system according to the first embodiment, the vector conversion function of converting the input raster image data into a vector data file is installed in the MFP 100 in FIG. 1. A vector mode for performing the vector conversion function is selected in the operation unit 113 and the display unit 116 in the MFP 100 and the vector data file for every attribute specified by the selected vector mode is generated.

Figure 15:
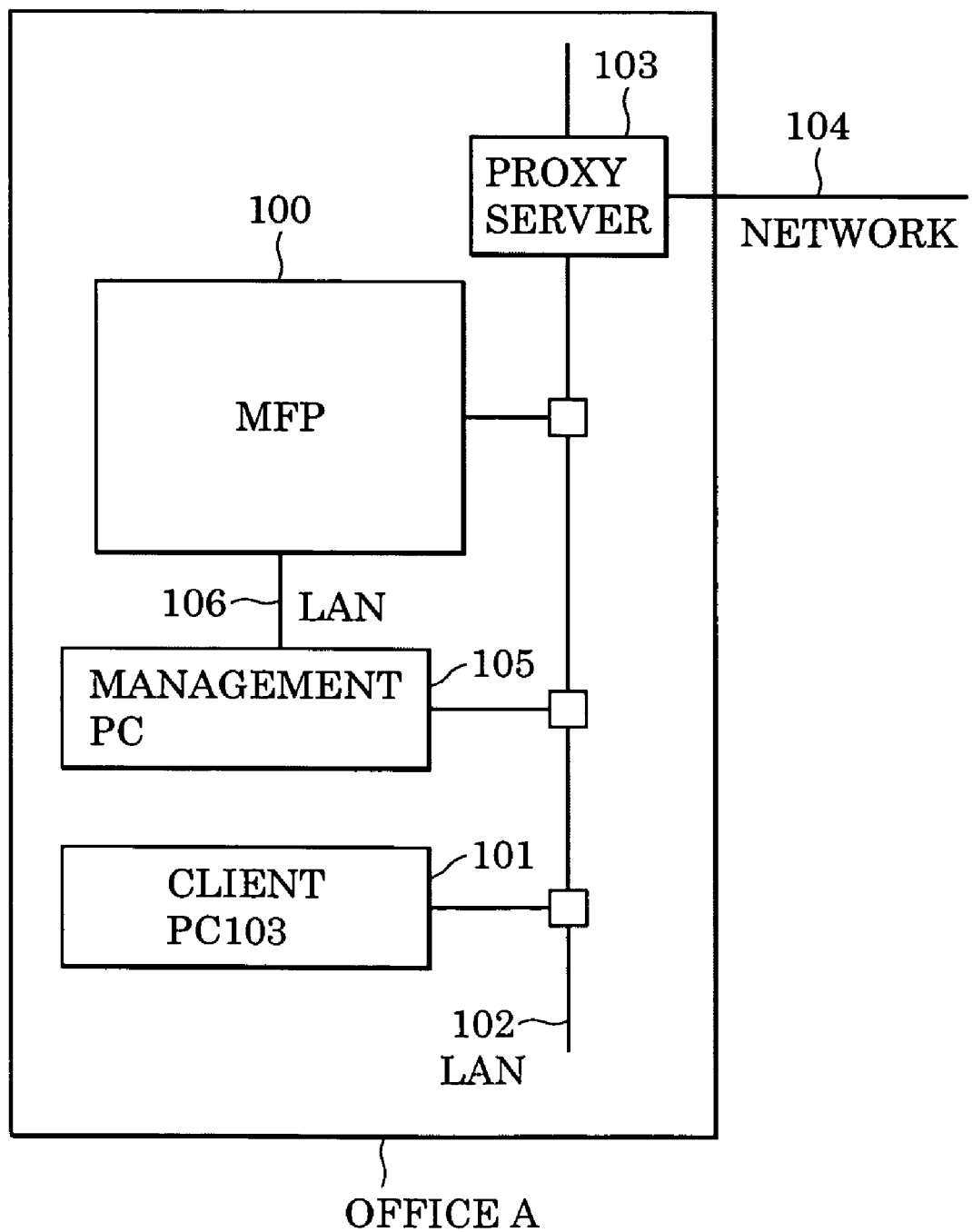
FIG. 15 is a block diagram of an image processing system according to a second embodiment of the present invention.

In contrast, in the structure of an image processing system according to a second embodiment, as shown in FIG. 15, a management PC 105 capable of controlling the MFP 100 is included in the MFP 100. A vector mode is selected and operated in an operation unit in the management PC 105. Raster image data input in the MFP 100 is transferred to the management PC 105 to perform the vector conversion for the transferred image data in the vector mode selected in the management PC 105.

The structure of the image processing system of the second embodiment is described next with reference to FIG. 15.

FIG. 15 is a block diagram of the image processing system according to the second embodiment of the present invention.

The same reference numerals are used in FIG. 15 to identify the same components as in the image processing system according to the first embodiment shown in FIG. 1. A detailed description of these components is omitted here.

The MFP 100 in FIG. 15 includes an image reading unit for reading a document and an image processing unit for performing part of image processing for an image signal read by the image reading unit. When a dedicated LAN 106 for connecting the MFP 100 to the management PC 105 is provided, the image signal generated in the MFP 100 is supplied to the management PC 105 through the LAN 106. In contrast, when the LAN 106 is not provided, the image signal generated in the MFP 100 is supplied to the management PC 105 through the LAN 102.

The management PC 105 includes an image storing unit, the image processing unit, a display unit, an operation unit, and so on as the components similar to those in a general personal computer. Some of the components are integrated with the MFP 100.

The management PC 105 includes standard components (for example, a CPU, a RAM, a ROM, a hard disk, an external storage device, a network interface, a display, a keyboard, and a mouse) provided in a general-purpose computer, as in the client PC 101.

The structure of the MFP 100 is described in detail next with reference to FIG. 16.

Figure 16:
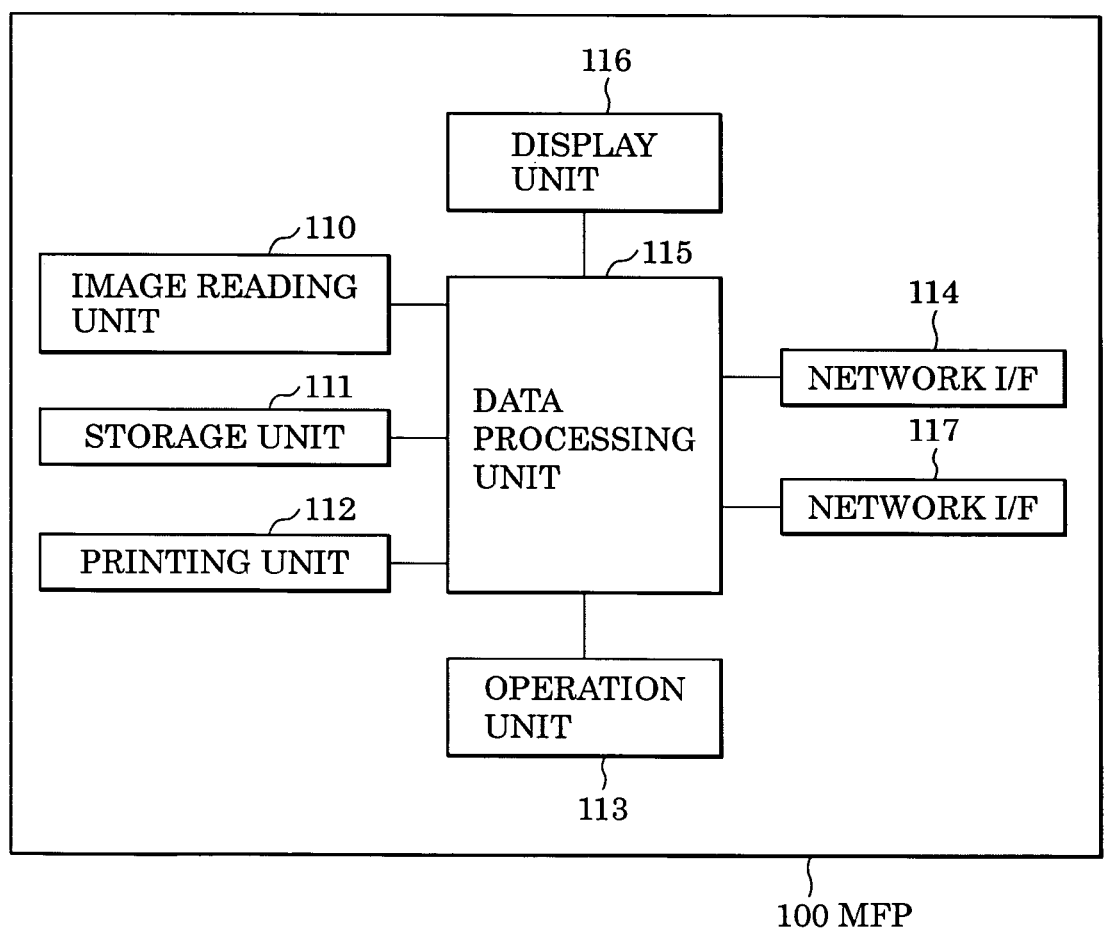
FIG. 16 is a block diagram of an MFP according to the second embodiment of the present invention.

FIG. 16 is a block diagram of the MFP 100 according to the second embodiment of the present invention.

The same reference numerals are used in FIG. 16 to identify the same components as in the MFP according to the first embodiment shown in FIG. 2. A detailed description of these components is omitted here.

Referring to FIG. 16, an operator may input his/her instructions in the MFP 100 through the operation unit 113 and the display unit 116 in the MFP 100, as in the first embodiment. Alternatively, the operator may input the instructions in the operation unit (for example, a keyboard or a mouse) provided in the management PC 105, and a status of the operator's instructions and image data during processing may be displayed in the display unit provided in the management PC 105.

The storage unit 111 can function as an external storage unit of the management PC 105. In such a case, the storage unit 111 is also controlled by the management PC 105.

When the LAN 106 is provided, direct data communication and data control between the MFP 100 and the management PC 105 is realized through a network I/F 117. When the LAN 106 is not provided, the data communication and data control therebetween is realized through the LAN 102 connected to the network I/F 114.

Summary of Processing

An overview of the entire process performed by the image processing system of the second embodiment is described next with reference to FIG. 17.

Figure 17:
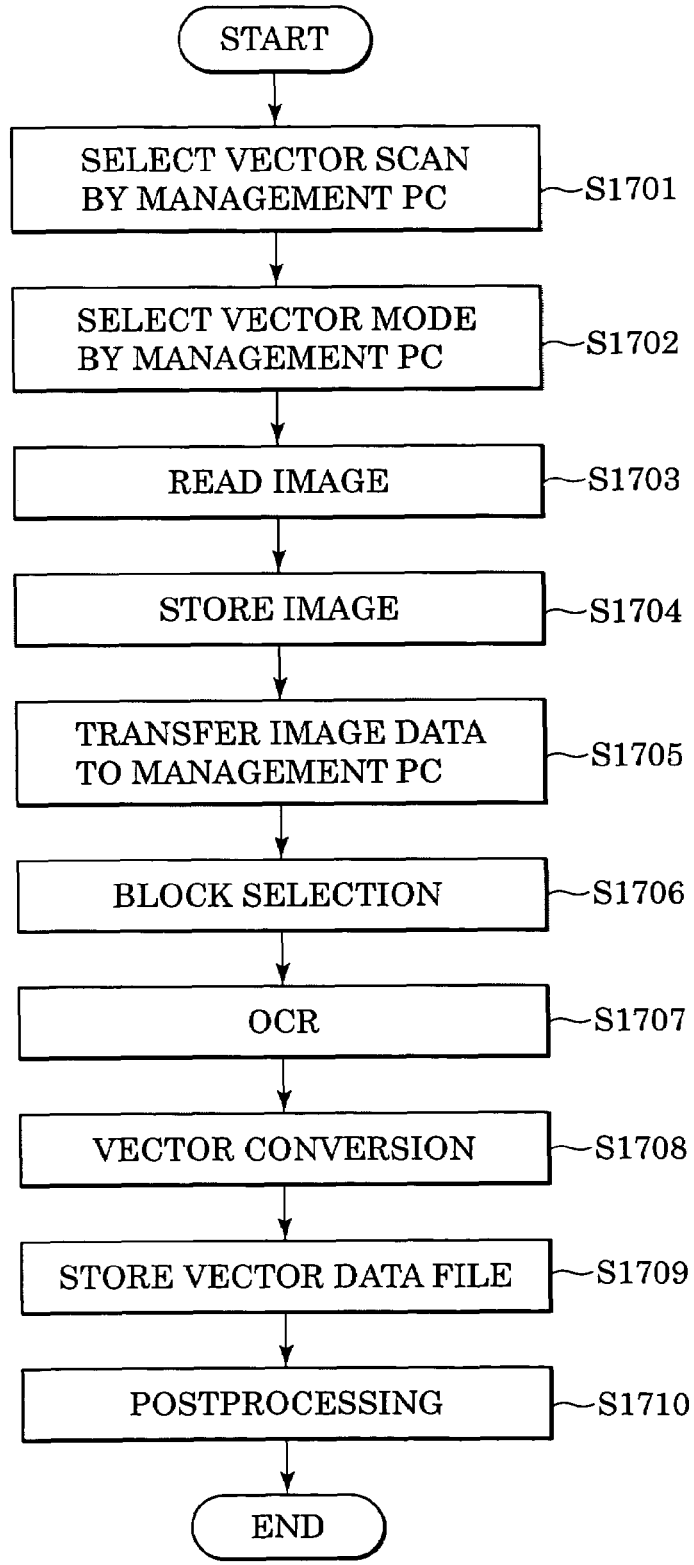
FIG. 17 is a flowchart showing an overview of the entire process performed by the image processing system according to the second embodiment of the present invention.

FIG. 17 is a flowchart showing the summary of the entire process performed by the image processing system according to the second embodiment of the present invention.

In Step S1701, after a document is set in the image reading unit 110 in the MFP 100, the process selects a vector scan based on an operation by using a vector scan selection key provided in the operation unit in the management PC 105.

In Step S1702, the process selects a desired vector mode by using a vector mode selection key in the operation unit in the management PC 105.

The operation unit and the display unit in the management PC 105 are structured so as to realize the same functions as in FIGS. 4A to 4C.

In Step S1703, the MFP 100 reads the document image on the document set in the image reading unit 110 and activates the vector scan in the vector mode specified by the management PC 105 by operating a start key for activating the vector scan in the operation unit in the management PC 105.

In the vector scan, first, one document is scanned in a raster pattern and read to obtain an image signal of, for example, 60 dpi and eight bits. In Step S1704, the process performs preprocessing for the image signal in the data processing unit 115 and, stores the preprocessed image signal as image data corresponding to one page in the storage unit 111.

In Step S1705, the process transfers the image data stored in the storage unit 111 to the management PC 105 through the LAN 102 or the LAN 106.

The management PC 105 activates a vector conversion application installed in the management PC 105 to perform Steps S1706 to S1708 corresponding to Steps S125 to S127 in FIG. 3 (the block selection, the OCR, and the vector conversion).

After the vector conversion in Step S1708 is completed, then in Step S1709, the layout information of each object (block) is stored as a vector data file in the storage unit in the management PC 105.

In Step S1710, the vector data file stored in the storage unit in the management PC 105 is subjected to postprocessing depending on the purpose of the vector scan.

As described above, in the structure of the image processing system according to the second embodiment, various instructions on the vector scan in the MFP 100 are provided through the operation unit and the display unit in the management PC 105, the image data read in the MFP 100 is transferred to the management PC 105, and the vector conversion is performed in the management PC 105. Accordingly, even when the MFP 100 does not have the vector conversion function or various settings (for example, the vector mode selection function) relating to the vector scan, connecting the management PC 105 allows the vector scan to be easily performed in a desired vector mode.

Third Embodiment

The structures for realizing the operation screens shown in FIGS. 4A to 4C with the operation unit and the display unit have been described in the first and second embodiments. Particularly, in these operation screens, operating the vector scan selection key, the vector mode selection key, the Vectorize key, and so on activates a series of vector scan processes to automatically generate the vector data file including the objects that have been divided into desired attributes.

In contrast, an image processing system according to a third embodiment has, in addition to the structures of the first and second embodiments, a structure (operation screen) in which a document image is previewed after the document image is read and the result of the block selection is confirmed before a vector data file corresponding to the document image is generated.

An operation screen according to the third embodiment is described next with reference to FIG. 18.

Specifications of Basic Operation

Figure 18:
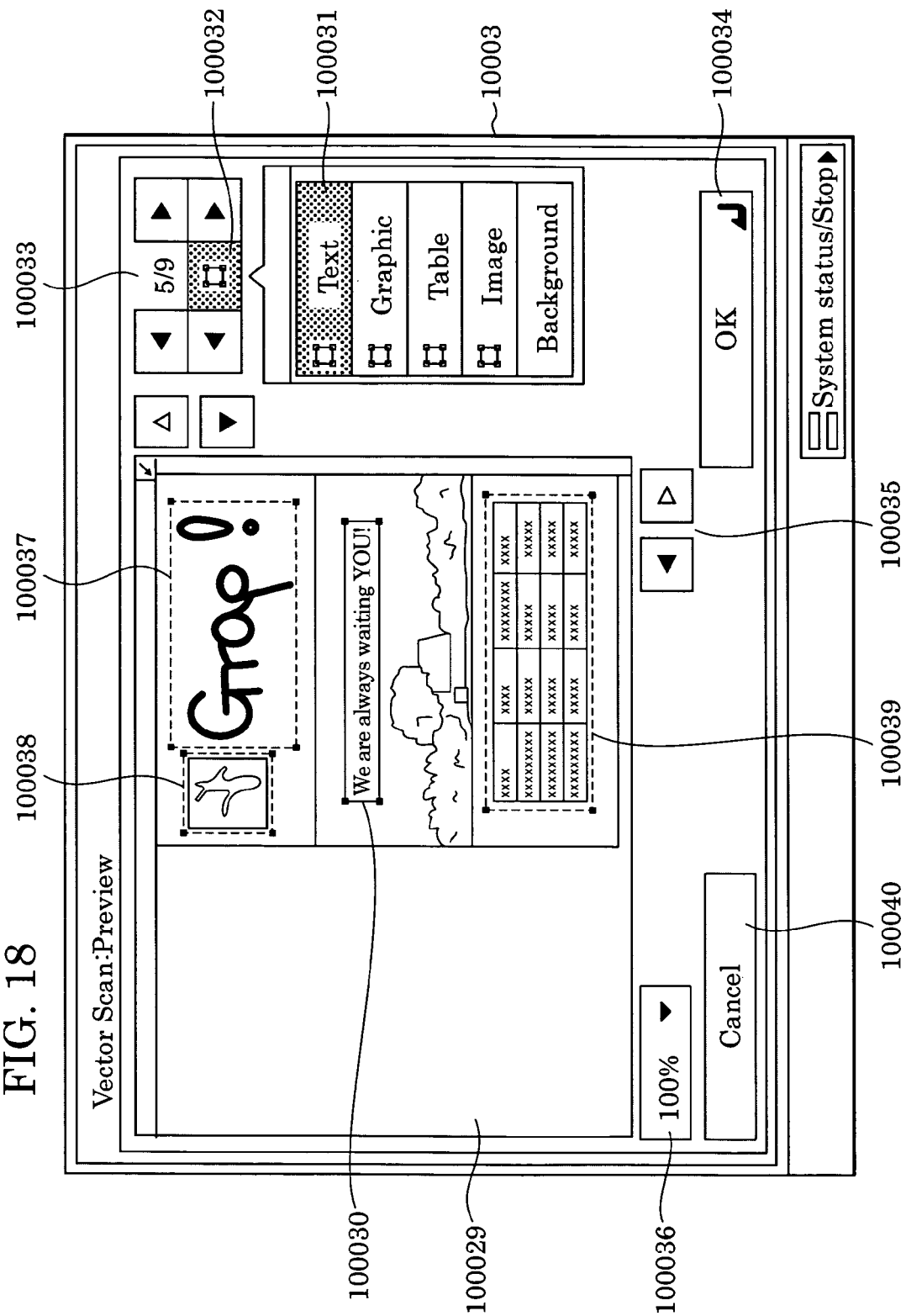
FIG. 18 shows an example of an operation screen according to a third embodiment of the present invention.

FIG. 18 shows an example of the operation screen according to the third embodiment of the present invention.

The operation screens shown in FIGS. 4A to 4C are commonly adopted in the operation screen of the third embodiment. According to the third embodiment, pressing the Start reading key 100020 in the operation screen 10002 in FIG. 4C causes the vector scan operation to be started. After the reading of the document is completed, the display is switched to an operation screen 10003 in FIG. 18.

The operation screen 10003 in FIG. 18 is an example of the operation screen when the Text/Graphic/Table/Image mode is selected by using the vector mode selection key 100021 in the operation screen 10002 in FIG. 4C.

After Steps from S121 to the block selection step in S125 in FIG. 3 (or Steps from S1701 to the block selection step in S1706 in FIG. 17) has been performed, the read image data and an image 100029, which is a result of the block selection, are displayed. Objects in the image 100029 are displayed in units of attribute processed in the block selection. The blocks are surrounded with rectangular frames.

The objects are displayed within the rectangular frames having different colors for every attribute that is automatically recognized in the block selection in Step S125 in FIG. 3 (or Step S1706 in FIG. 17).

Representing the rectangular frames around the objects in different colors, for example, representing the Text (character) in red and the Image (picture) in yellow, permits easy recognition of the object for every attribute divided in the block selection, thereby improving the visibility of an operator. The rectangular frames may be displayed in other display patterns including different widths of the lines or different line patterns (e.g., solid lines, dotted lines, dashed lines, etc.), instead of being displayed in different colors. The objects may be screened in different manners for display.

Although the image 100029 is initially displayed as the image read in the storage unit 111, the image 100029 can be enlarged/reduced, as required, by using an enlargement/reduction key 100036. When enlargement causes the display content of the image 100029 not to be fit in the display area, an invisible part can be seen by horizontally and vertically moving the image 100029 by using a scroll key 100035.

FIG. 18 shows a state in which a character object 100030 (a character string "We are always waiting YOU!") in the central part of the image 100029 is selected. Particularly, in FIG. 18, the selected object is surrounded with a solid-line rectangular frame in a color indicating the corresponding attribute (in this case, red), whereas the remaining unselected objects are surrounded with broken-line rectangular frames in colors indicating the corresponding attributes. Displaying the selected rectangular frame differently from the unselected rectangular frames permits easy determination of the selected state or the unselected state of each object.

In the example shown in FIG. 18, the character object 100030 is surrounded with the solid-line rectangular frame in red, a graphic object 100037 is surrounded with a broken-line rectangular frame in blue, an image object 100038 is surrounded with a broken-line rectangular frame in yellow, and a table object 100039 is surrounded with a broken-line rectangular frame in green. The remaining parts are background objects.

Since the background objects are image parts remaining after the objects in the image 100029 are extracted, they are not surrounded by the rectangular frames. However, the outlines of the background images may be surrounded with the rectangular frames, as in the other objects, in the sense of background specification.

One method of selecting the object, for example, to edit the character string in a character object or to perform color control of a graphic object, is to directly touch the area inside the character object 100030 to specify the character object 100030. Another method thereof is to use an object selection key 100032 to specify the character object 100030. In any of the methods, the selected object is surrounded by the solid-state rectangular frame and the unselected objects are surrounded by the broken-line rectangular frames.

At the same time, one object attribute key 100031 (although Text key is selected in this example, any of Graphic, Table, Image, and BackGround keys can be selected) corresponding to the attribute of the selected object is selected. In this case, the corresponding object attribute key is screened in order to indicate the selected state. Other display patterns, such as hatching or blinking, may be used as long as the selected and unselected states can be distinguished based on the display patterns.

When the ADF is used to read a document including multiple pages, the image of a first page among the multiple pages is displayed in the initial state of the operation screen 10003. A page specification key 100033 can be used to switch to a desired page and to display the image of the page.

Pressing an OK key 100034 stores the vector data file corresponding to the displayed image 100029. In contrast, pressing a Cancel key 100040 discards the various settings set in this operation screen 10003 to go back to the operation screen 10000 shown in FIG. 4A, which is the basic screen for copying.

Specifications of Transmission/Fax Operation

Operation screens for file transmission/fax are described next with reference to FIGS. 19A to 19C.

Figure 19A:
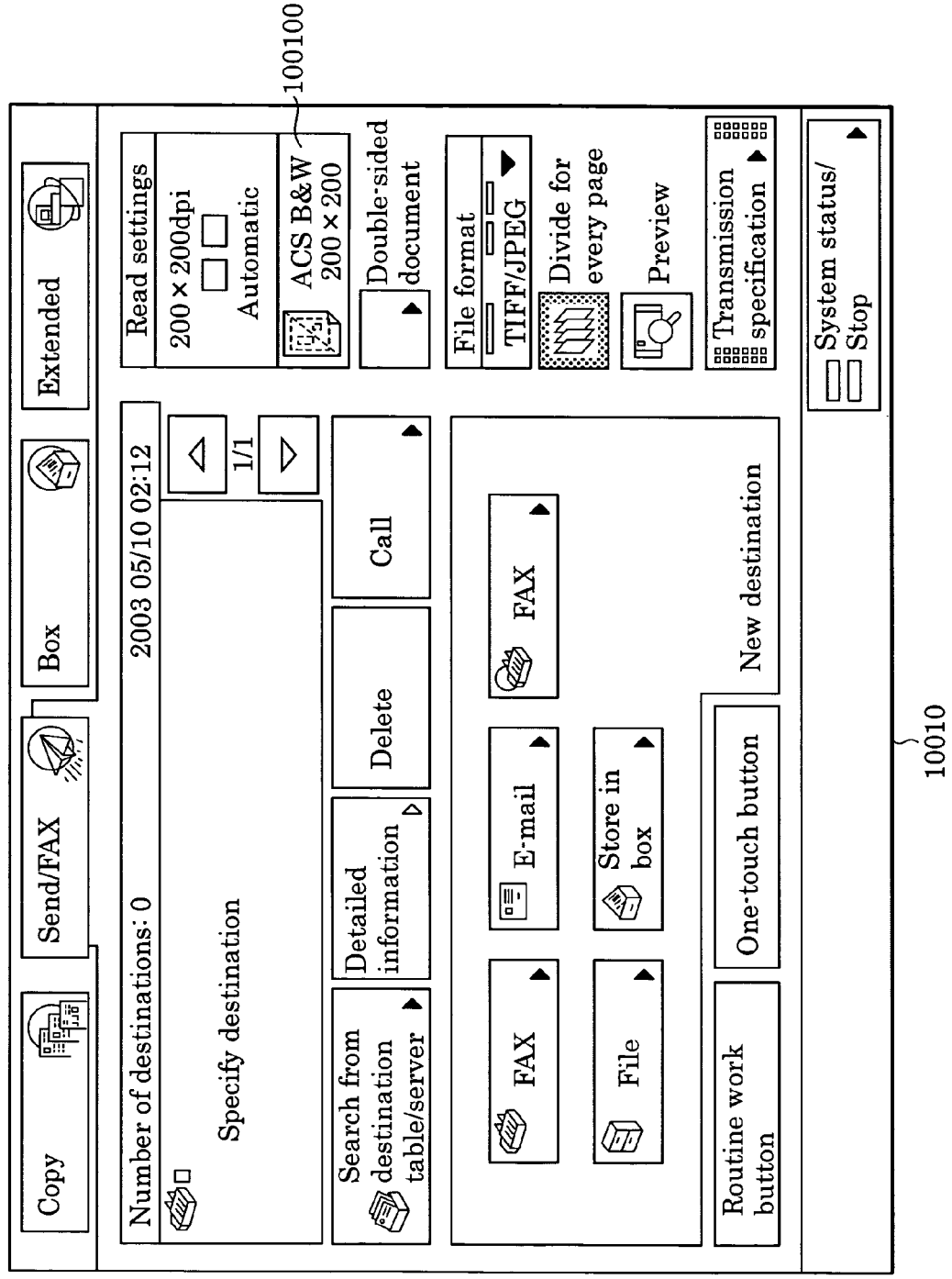
Figure 19B:
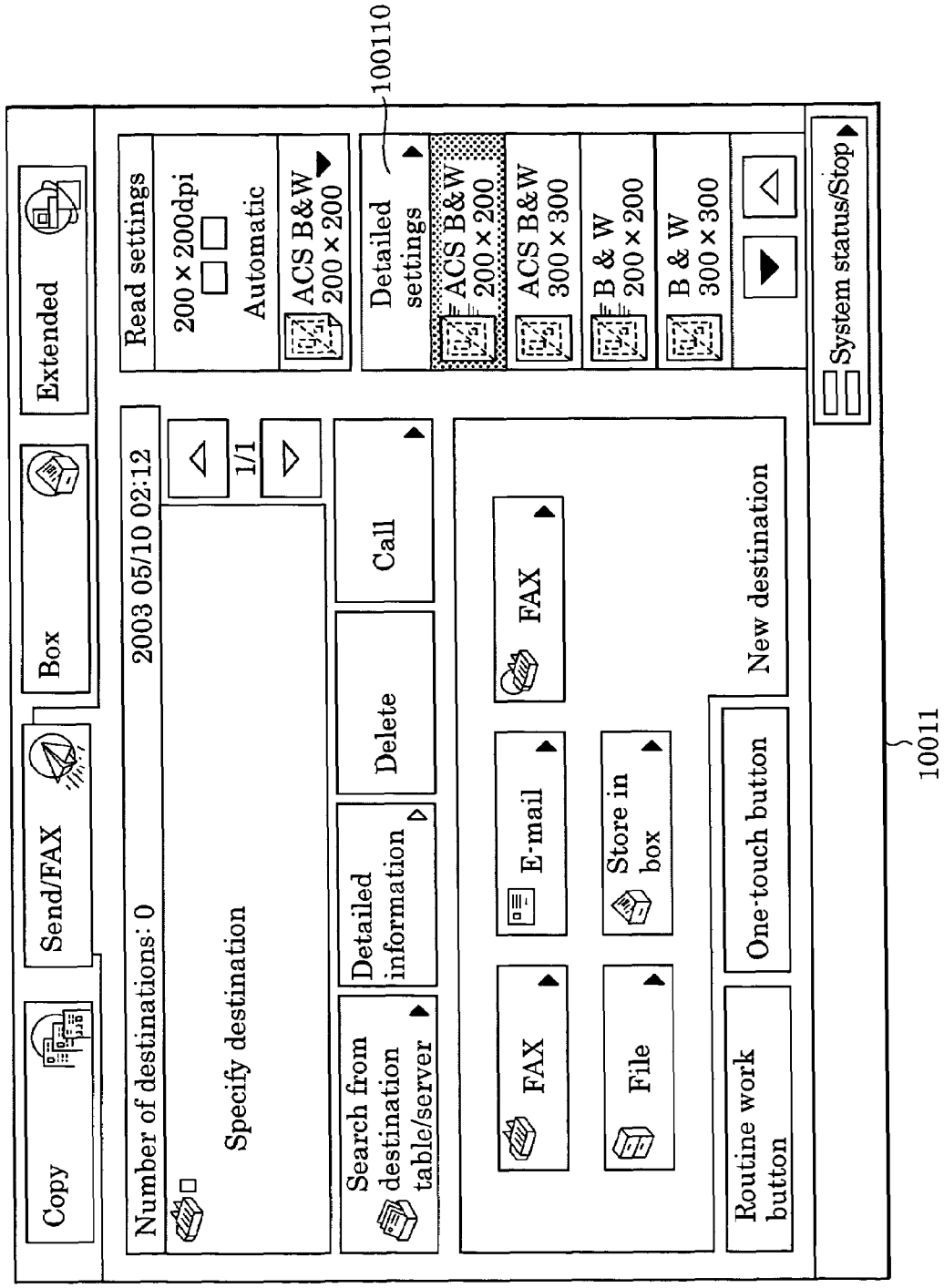

FIGS. 19A to 19C show examples of the operation screens for file transmission/fax according to the third embodiment of the present invention.

An operation screen 10010 in FIG. 19A is a basic screen for file transmission/fax. In order to perform operations on the operation screen 10010, it is necessary to set read settings when a document image to be processed is read into the MFP 100 by using a read settings pulldown menu 100100. Pressing the read settings pulldown menu 100100 displays a pulldown menu, as shown in an operation screen 10011 in FIG. 19B. With this pulldown menu, for example, 200×200 dpi or 300×300 dpi can be selected as a read setting.

Next, pressing a detailed settings key 100110 in the operation screen 10011 displays an operation screen 10012 (read settings screen) shown in FIG. 19C. Pressing an application mode key 100120 in the operation screen 10012 displays the operation screen 10003 in FIG. 18. The same operations as in the specifications of the basic operation described above can subsequently be realized.

Specifications of Box Operation

Operation screens for storing the image data read in the MFP 100 in the storage unit 111 in the MFP 100 (box function) are described next with reference to FIGS. 20A to 20D.

FIGS. 20A to 20D show examples of the operation screens for the box function according to the third embodiment of the present invention.

Figure 20A:
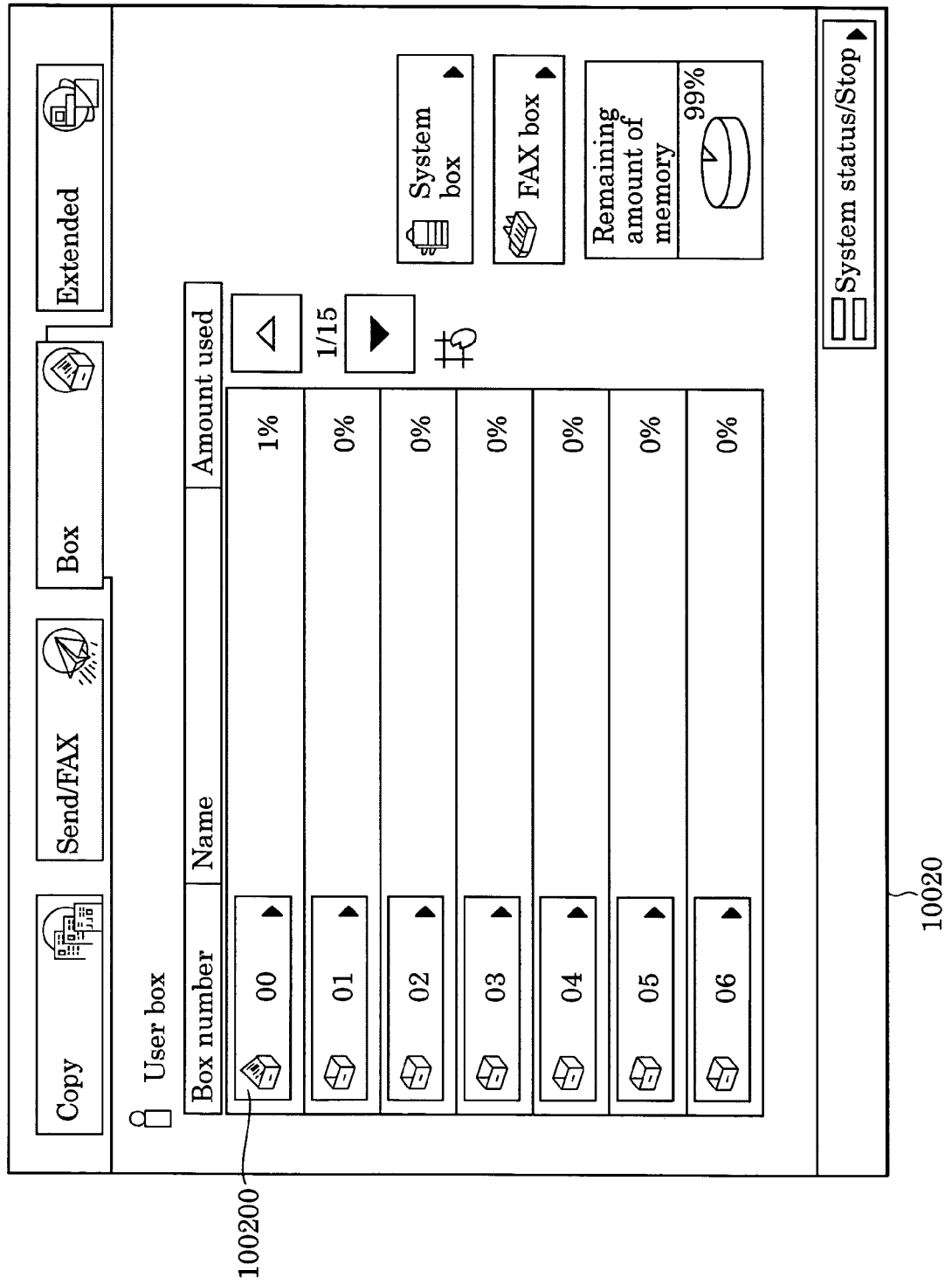

An operation screen 10020 in FIG. 20A is a basic screen for storing the image data (the box function). Pressing a box key 100200, indicating a box 00, in a box group (storage units) currently managed by the MFP 100 displays an operation screen 10021 shown FIG. 20B.

Pressing a read document key 100211 in the operation screen 10021 displays a read/set document screen. The read/set document screen is the same as in the specifications of transmission/fax operation. In this case, the operation screen 10012 in FIG. 19C is displayed.

In the example shown in FIG. 20B, a state in which one data file has already been stored in the box 00 is displayed. Pressing a data file line 100210 selects the corresponding data file that can be processed.

An operation screen 10022 shown in FIG. 20C displays a state in which the data file is selected. In the operation screen 10022, a selected line 100220 is highlighted (hatched). Selecting the data file allows the content of the data file to be confirmed. In this case, pressing a display image key 100222 displays the operation screen 10003 in FIG. 18. The same operations as in the specifications of the basic operation described above can subsequently be realized.

Similarly, pressing a print key 100221 in the operation screen 10022 in FIG. 20C displays an operation screen 10023 shown in FIG. 20D. With the operation screen 10023, print settings can be set. Pressing an application mode key 100230 displays the operation screen 10003 in FIG. 18. The same operations as in the specifications of the basic operation described above can subsequently be realized.

As described above, according to the third embodiment, in addition to achievement of the effects described above in the first and second embodiments, an image including the result of the block selection in a specified vector mode is displayed as a preview display of the image after the document image has been read, so that the result of the block selection, which is obtained by actually executing the vector scan, can be confirmed in advance. Based on this result, it is possible to determine whether the postprocessing is to be performed.

Fourth Embodiment

According to the third embodiment, by previewing the image including the result of the block selection of a document image after the document image is read, the result of the block selection can be confirmed in advance before the vector data file is finally generated.

In contrast, according to a fourth embodiment, a structure in which the result of the block selection can be changed when the result of the block selection displayed in the preview is not an intended result is described.

Specifically, when an object does not exit as the object having a desired attribute among the objects displayed in the operation screen 10003 in FIG. 18, it is possible to change the attribute by using the operation screen 10003.

For example, when the attribute of the character object 100030 is to be changed from the Text attribute to the Graphic attribute, the character object 100030 is touched for selection after a change attribute button (not shown) on the operation screen 10003 is pressed. Selecting the Graphic key from among the object attribute keys 100031 changes the Text attribute to the Graphic attribute.

In this case, after the attribute is changed, the color of the rectangular frame of the character object 100030 may be changed to blue indicating the Graphic attribute, or the character object 100030 may be surrounded with a rectangular frame formed of a double line including a line in red indicating the Text attribute and a line in blue indicating the Graphic attribute in order to confirm the attributes before and after the change.

As described above, according to the fourth embodiment, in addition to achievement of the effects described above in the third embodiment, the attribute of the object displayed in the preview can arbitrarily be changed. Hence, even when an object that does not have a desired attribute exists in the preview, the attribute of the object can appropriately be changed to the desired attribute.

Fifth Embodiment

According to the third and fourth embodiments, the structures capable of the preview display in the operation screen 10003 in FIG. 18 are described.

In contrast, according to a fifth embodiment, the display content of the object attribute keys 100031 on the operation screen 10003 in FIG. 18 may be changed in accordance with the vector mode selected by using the vector mode selection key 100021 on the operation screen 10002 in FIG. 4C.

For example, when the Text mode is selected with the vector mode selection key 100021, only the Text is included in the object attribute keys 100031 in FIG. 18. Alternatively, a list of modes that can be selected with the vector mode selection key 100021 may be included in the object attribute keys 100031. In this case, the attribute specified by the vector mode actually selected with the vector mode selection key 100021 is displayed and the other attributes are displayed in grey as non-selective attributes.

As described above, according to the fifth embodiment, in addition to achievement of the effects described above in the third and fourth embodiments, only the selective attributes are included in the object attribute keys in the preview display. Accordingly, it is possible to easily confirm the selective attributes and to improve the responsiveness of the operation based on the attributes.

Sixth Embodiment

According to the fourth embodiment, the attributes of the object displayed in the preview display on the operation screen 10003 in FIG. 18 can be changed. In contrast, according to a sixth embodiment, in addition to the structure of the fourth embodiment, an ON/OFF key for specifying whether the vector conversion is finally performed for the object having a desired attribute may be provided.

As described above, according to the sixth embodiment, in addition to achievement of the effect described above in the fourth embodiment, it is possible to determine whether the vector conversion is finally performed for the object having a desired attribute after the result of the block selection is confirmed in the preview display on the operation screen 10003 in FIG. 18.

Seventh Embodiment

According to the third to fifth embodiments, the result of the block selection is previewed on the operation screen 10003 in FIG. 18. In contrast, according to a seventh embodiment, an image including the result of the vector conversion is previewed, and the attribute of the object may be changed or the vector conversion may be turned on/off in the preview display.

In this case, when raster image data is to be converted into a vector data file, the raster image data is separately stored. After the re-specification, the vector conversion may be performed again or the vector conversion may be performed for the raster image data converted from the vector data file.

Eighth Embodiment

According to the first to seventh embodiments described above, the process in FIG. 3 is performed for the image to be processed, which is read from the MFP 100. In contrast, according to an eighth embodiment, the process in FIG. 3 may be performed for, for example, print data received from the client PC 101 or image data received over the network 104 (for example, image data photographed by a digital camera).

Ninth Embodiment

Although the image processing system is realized in the office A in FIG. 1 in the first to eighth embodiments described above, an image processing system may be realized in the MPF in another office on the network 104 or in an MPF on the network 104.

Tenth Embodiment

Although the image processing system is structured so as to realize the function thereof by using the MFP or the management PC, the function of the image processing system may be realized by using any device capable of processing image data (for example, a digital camera or a portable terminal such as a personal digital assistant (PDA) or a cellular telephone).

Eleventh Embodiment

When the original image corresponding to the input image data has already been managed in the storage unit in the MFP 100 or a server on the network, the process in FIG. 3 may be performed for the original image.

Twelfth Embodiment

Although the MFP or the management PC is operated to specify the vector mode in the embodiments described above, the present invention is not limited to this structure and various modifications can be introduced. For example, the object surrounded with a closed area that is written in a document with a marking pen may be vectorized in accordance with a desired vector mode.

In addition to the embodiments of the present invention described in detail above, the present invention can provide aspects including a system, an apparatus, a method, a program, and a storage medium. Specifically, the present invention may be applied to a system including a plurality of devices or may be applied to an apparatus including a single device.

Processing of the present invention can be achieved by the computer in a system or an apparatus to which software programs (in the above embodiments, programs corresponding to the flowcharts) for realizing the functions of the embodiments described above are directly or remotely supplied. The computer that reads and executes the supplied program code can achieve the functions of the embodiments described above.

The program code itself, installed in the computer, for achieving the functions of the present invention by the computer realizes the present invention.

In this case, the computer program may be object code, a program executed by an interpreter, script data supplied to the OS, or the like, which have the function of the computer program.

Storage media for supplying the program include, for example, a flexible disk, a hard disk, an optical disc, a magneto-optical disk (MO), a compact disk read only memory (CD-ROM), a compact disk recordable (CD-R), a compact disk rewritable (CD-RW), a magnetic tape, a nonvolatile memory card, a ROM, and a digital versatile disk (DVD), such as a DVD-ROM and DVD-R.

The program can be acquired by accessing a Web page on the Internet by using a browser on a client computer to download the program itself according to the present invention or a compressed file having an automatic installation function from the Web page into a storage medium such as a hard disk. Alternatively, the program can be acquired by downloading, from different Web pages, a plurality of files into which the program code constituting the program according to the present invention is divided. In other words, a world wide web (WWW) server from which the program file for realizing the function of the present invention by the computer is downloaded to a plurality of users is within the scope of the present invention.

An encrypted program can be decoded by using a cryptographic key for deciphering the code to be installed in the computer. The cryptographic key is downloaded from a Web page to a user that satisfies a predetermined condition over the Internet when the program of the present invention is encoded and stored in a storage medium, such as a CD-ROM, and is delivered to users.

The computer can execute the read program to achieve the functions of the embodiments described above. Or, the OS or the like running on the computer can execute all or part of the actual processing based on the instructions in the program to achieve the functions of the embodiments described above.

Alternatively, after the program read out from the storage medium has been written in a memory that is provided in a function expansion board included in the computer or in a function expansion unit connected to the computer, the CPU or the like in the function expansion board or the function expansion unit can execute all or part of the actual processing based on the instructions in the program to realize the functions of the embodiments described above.

The processes described above (the block selection and the conversion into the vector data) may be performed by circuits in hardware. In this case, the CPU in the data processing unit in the MFP controls the data path to the hardware to perform the processes in the hardware and receives the result of the processes. Each process can be performed by an appropriate combination of hardware and software.

According to the embodiments described above, generating a data file having an appropriate structure in accordance with the application or purpose allows an image processing apparatus or an information processing apparatus capable of efficiently performing the process based on the read document image to be realized in various structures and allows provision of a method or program for controlling the image processing apparatus or the information processing apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
    a reading unit adapted to read an image and to generate image data representing the image;
    a separating unit adapted to separate the image data obtained by the reading unit into a plurality of objects corresponding to attributes;
    a selecting unit adapted to select, based on a user manipulation, at least one of the attributes corresponding to the objects separated by the separating unit, the selected attribute corresponding to an object for performing a vector conversion process;
    a vectorization unit adapted to perform the vector conversion process for the image data of at least one of the objects separated by the separating unit and to generate vector data as a result of the vector conversion process in accordance with the attribute selected by the selecting unit; and
    an output unit adapted to output the generated vector data corresponding to the object having the attribute selected by the selecting unit and the image data on which the vector conversion process is not performed corresponding to the object having the attribute not selected by the selecting unit.

2. The apparatus according to claim 1, further comprising a display unit adapted to display the image and the attribute corresponding to each of the objects.

3. The apparatus according to claim 2, further comprising a changing unit adapted to change the displayed attribute of the object.

4. The apparatus according to claim 2, further comprising a determining unit adapted to determine whether the vector conversion process is to be performed for each of the objects.

5. The apparatus according to claim 1, wherein the attributes include Text and the vectorization unit performs character recognition for the image data having the Text attribute.

6. The apparatus according to claim 1, wherein the attributes include Graphic and the vectorization unit performs function approximation for the image data having the Graphic attribute.

7. An image processing method comprising the steps of:
    obtaining image data representing an image;
    separating the image data into a plurality of objects corresponding to attributes;
    selecting, based on a user manipulation, at least one of the attributes corresponding to the separated objects, the selected attribute corresponding to an object for performing a vector conversion process;
    performing the vector conversion process for the image data of at least one of the separated objects and generating vector data as a result of the vector conversion process in accordance with the selected attribute; and outputting the generated vector data corresponding to the object having the attribute which is selected for performing the vector conversion process and the image data on which the vector conversion process is not performed corresponding to the object having the attribute which is not selected for performing the vector conversion process.

8. A computer-readable medium having a computer readable program stored thereon, the computer readable program including instructions executable by a computer, the instructions comprising:

obtaining image data representing an image;

separating the image data obtained into a plurality of objects corresponding to attributes;

selecting, based on a user manipulation, at least one of the attributes corresponding to the separated objects, the selected attribute corresponding to an object for performing a vector conversion process;

performing a vector conversion process for the image data of at least one of the separated objects and generated vector data as a result of the vector conversion process in accordance with the selected attribute; and outputting the generated vector data corresponding to the object having the attribute which is selected for performing the vector conversion process and the image data on which the vector conversion process is not performed corresponding to the object having the attribute which is not selected for performing the vector conversion process.

* * * * *